(12) United States Patent
Khan

(10) Patent No.: US 12,392,135 B2
(45) Date of Patent: Aug. 19, 2025

(54) SELF-GRIPPING, NO-SLIP REBAR COUPLER

(71) Applicant: Imran N. Khan, Denver, CO (US)

(72) Inventor: Imran N. Khan, Denver, CO (US)

(*) Notice: Subject to any disclaimer, the term of this patent is extended or adjusted under 35 U.S.C. 154(b) by 0 days.

(21) Appl. No.: 19/042,553

(22) Filed: Jan. 31, 2025

(65) Prior Publication Data

US 2025/0179799 A1    Jun. 5, 2025

Related U.S. Application Data

(63) Continuation of application No. PCT/US2024/054910, filed on Nov. 7, 2024.

(60) Provisional application No. 63/548,211, filed on Nov. 12, 2023.

(51) Int. Cl.
    *E04C 5/16* (2006.01)

(52) U.S. Cl.
    CPC .................. *E04C 5/165* (2013.01)

(58) Field of Classification Search
    CPC .......... E04C 5/162; E04C 5/163; E04C 5/165; F16B 7/0406; Y10T 403/5713
    See application file for complete search history.

(56) References Cited

U.S. PATENT DOCUMENTS

| | | | |
|---|---|---|---|
| 6,176,051 B1* | 1/2001 | Sorkin | E04C 5/165 |
| | | | 403/374.1 |
| 10,196,820 B2* | 2/2019 | Sorkin | E04C 5/08 |
| 11,028,588 B2* | 6/2021 | Lee | F16B 7/0406 |
| 2018/0016789 A1* | 1/2018 | Sorkin | E04C 5/122 |
| 2018/0335061 A1* | 11/2018 | Song | E04C 5/165 |
| 2019/0093362 A1* | 3/2019 | Lee | F16B 37/0857 |
| 2019/0234443 A1* | 8/2019 | Man | F16B 7/182 |
| 2021/0355683 A1* | 11/2021 | Won | F16B 7/0406 |
| 2022/0235550 A1* | 7/2022 | Yoon | E04C 5/165 |

FOREIGN PATENT DOCUMENTS

| | | | | |
|---|---|---|---|---|
| CH | 138367 A | * | 2/1930 | |
| EP | 0098099 A2 | * | 1/1984 | |
| WO | WO-2004092508 A1 | * | 10/2004 | .............. E04C 5/165 |

* cited by examiner

*Primary Examiner* — Christine T Cajilig
(74) *Attorney, Agent, or Firm* — Colorado Venture Patents LLC

(57) ABSTRACT

The invention comprises an improved rebar coupler designed to simplify joining rebar while minimizing slippage. It features a male and female threaded external housing, an internal cylinder, springs, and tightening members with wedges. The coupler creates an opposing force to lock rebar securely, addressing challenges in existing methods. Available in two-piece and three-piece configurations, it accommodates various rebar sizes without modification. The design allows for single-person operation, reduces manual labor, and enhances structural integrity. The rebar coupler meets stringent standards like CalTrans CT670, offering advantages over existing products by eliminating heavy equipment needs and complex installation procedures.

16 Claims, 24 Drawing Sheets

SELF-GRIPPING, NO-SLIP REBAR COUPLER

CROSS REFERENCE TO RELATED APPLICATIONS

This application claims the benefit of U.S. Provisional Patent Application 63/548,211, filed on Nov. 12, 2023, which is hereby incorporated by reference in its entirety.

BACKGROUND OF THE INVENTION

Technical Field

The present invention relates to a reinforcement bar, or rebar, coupler.

Background Art

In general, rebar is embedded inside concrete when constructing a steel reinforced concrete structure in order to reinforce the strength of the concrete structure. In particular, a large number of rebars are used for reinforcement in large buildings, special structures, and engineering work structures such as bridges. Nonetheless, when using rebars in extensive construction projects like large buildings, unique structures, and engineering works such as bridges, it becomes necessary to join them together, as they are produced and transported in limited lengths.

Historically, the conventional approaches for connecting reinforcement bars have encompassed techniques such as lap jointing, welding, screw-machining, mechanical jointing, and similar methods.

Lap jointing is a technique used to connect reinforcement bars by overlapping them at a specified length and securing them with wire or steel wire until concrete is poured and the bond of the rebar deformations with the concrete create the strength for the lap jointing to be effective. However, this method results in a significant excess use of reinforcement bars while also creating congestion within the concrete, and the connected sections are prone to detachment if the surrounding concrete cracks or spalls away. Furthermore, it leads to poor constructability and increased working time, which presents challenges. Welding, on the other hand, has its own set of issues, including the difficulty of construction and the notable weakening of adjacent reinforcement bar sections due to the heat generated during the welding process.

However, in the foregoing technologies, when the reinforcement bars are connected to each other at work sites, a great deal of manual labor of craftsmen is required. A commonly encountered challenge associated with the coupling of rebar is the effort and risk of injury required in demanding situations. It is common for construction workers in particular to utilize bulky, vibrating and cumbersome heavy equipment in association with the coupling of rebar during construction applications. Injuries in association with such uses are relatively common. Such equipment can be extremely dangerous. Often, lack of safety guards on tools, failure to provide protection, and inadequate training are common reasons injuries arise in association with rebar coupling. Thus, the use of such tools-particularly at heights—can raise the risk profile to construction workers. Moreover, the high weight and elongated shape makes excessive manipulation of even a single piece of rebar a challenging endeavor for construction workers. In particular, coupling mechanisms that require twisting of the rebar itself to allow for threaded coupling of an end of rebar, for example as described within U.S. patent application Ser. No. 11/621,596 filed on Jan. 10, 2007, which is hereby incorporated by reference in its entirety, and similar applications, often require a high energy expenditure on the part of the construction worker and place him or her in an enhanced risk situation. Various other rebar couplers require the placement and securement of many bolts to essentially clamp the two end regions of two separate rebars together. These types of applications disadvantageously require the expenditure of excessive effort by construction workers and also the utilization of cumbersome tools such as pneumatic torquing tools.

Relatedly, a variety of problems arise from the challenges associated from lifting objects during construction, particularly on sites involving the construction of tall buildings and bridges. During 2020, being struck by a falling object accounted for approximately 17 percent of illness and injury involving days away from the job, according to the National Safety Council. The risk of falling or flying objects, which is enhanced by excessive tooling and complex coupling components associated with joining rebar at heights, is a particularly common type of struck-by accidents. Improperly bracing structures or placing loads on a concrete structure, for example by improperly joining rebar, that hasn't undergone a safety check are a few examples of the ways that accidents can occur and place construction workers at risk. Moreover, falls, slips and trips—which can be more commonly prevalent with excessive tooling and equipment—were the leading cause of fatalities in the construction industry from 2015-2019 according to the U.S. Bureau of Labor Statistics. It therefore remains desirable to have a mechanism to simply and securely couple rebar at heights while minimizing the need for excessive external equipment.

A key problem associated with the joinder of rebar, particularly embodied within existing "one-touch" rebar coupling attempts, is the potential for slip. The concept of "one-touch" style rebar couplers has become more commonplace in recent years, as evidenced by examples described within U.S. Pat. No. 10,385,569 filed on Jul. 7, 2015 and U.S. patent application Ser. No. 17/614,453 filed on Jun. 10, 2019, each of which is incorporated by reference in their entirety. In general, the "one-touch" rebar coupling concept refers to coaxial placement of two separate pieces of rebar into the opposing ends of an exemplary device. In accordance with intended use, such a mechanism purportedly secures the two pieces of rebar together in association with construction applications. However, a challenge that remains, especially in association with many such devices, is the prevalence of slip. In other words, rather than securely holding two ends of rebar together, each piece of rebar may slightly or greatly move relative to the other piece of rebar in association with many exemplary uses. Where slip is prevalent in completed building and bridge structures, for example, cascading failure of rebar junctions in construction applications can pose a potential risk. Therefore, it remains desirable to provide an improved rebar coupling device that retains the advantages of minimal effort to join rebar in association with "one-touch" styled devices.

Pertaining to the specific tolerance for slip, California laws remain among the most restrictive. In many circumstances, presumed that compliance with the California requirements for coupling of rebar in association with construction and transportation-related applications generally means that compliance may be attainable in other jurisdictions. Moreover, evaluation reports from the International Code Council (ICC) are among the most preferred resources used by officials to verify that building products comply with code requirements. The key relevant criteria utilized by the ICC to evaluate the coupling of rebar is ACC133: Acceptance Criteria for Mechanical Connector Systems for Steel Reinforcing Bars. A key problem associated with many rebar coupling systems, and in particular "one-touch" and other effort-minimizing rebar coupling or rebar connection systems, is that they do not meet the relevant California or ICC standards, such as those articulated in ACC133. Often, the failure of such prior art devices is associated with suboptimal slip characteristics. It therefore remains desirable to provide an improved rebar coupling device that retains the advantages of minimal effort to join rebar that further meets the relevant governmental requirements and standards, such as those articulated and referred to in ACC133.

For the aforementioned and other reasons, an improved mechanism for the coupling of rebar is desirable.

SUMMARY OF THE INVENTION

The preferred embodiment of the invention comprises an improved rebar coupler designed to simplify the process of joining two pieces of rebar while minimizing or eliminating the potential for slippage. The rebar coupler can be configured in either a two primary body configuration or a three primary body configuration, both aimed at providing a secure, slip-resistant connection between two pieces of rebar while minimizing the effort required for installation.

In the two primary body configuration, the rebar coupler comprises a male threaded external housing and a female threaded external housing. These two primary bodies house the internal components necessary for gripping and securing the rebar pieces. This configuration includes an internal cylinder, a first set of tightening members and a second set of tightening members (each comprising a plurality of wedges), one or more elastic support rings, and at least one spring extending through the internal cylinder. The male and female threaded external housings are designed to be directly screw-coupled, eliminating the need for a separate coupler body or tightening unit.

The three primary body configuration builds upon the two-piece design by introducing a central housing piece 500 between the male and female threaded external housings. This additional component allows for variations in the internal structure, such as the placement of the stop plate. The three primary body configuration can be implemented in several ways, including: with a stop plate built into the middle housing piece, with no stop plate and an internal through cylinder, or with a stop plate within the internal cylinder. This configuration maintains the core functionality of the two-piece design while offering additional flexibility in the coupler's internal arrangement.

Both configurations of the rebar coupler are designed to address several key challenges associated with existing rebar coupling methods, particularly in demanding construction situations. The rebar coupler minimizes the need for extensive manual labor and heavy equipment, reducing the risk of injuries commonly associated with traditional rebar coupling methods. The "one-touch" style design allows for coaxial placement of two separate pieces of rebar into the opposing ends of the device, significantly simplifying the installation process.

A critical feature of the invention is its ability to minimize or eliminate slip between the coupled rebar pieces, addressing a significant issue in existing rebar coupling methods, particularly in applications subject to cyclical loading. The rebar coupler can accommodate various rebar sizes without modification, ranging from #3 nominal rebar (approximately 0.375 inch diameter) to #18 nominal rebar (approximately 2.25 inch diameter). The design allows for the entire coupling process to be performed by a single person, reducing labor requirements and improving efficiency on construction sites.

By minimizing slip and ensuring a secure connection, the rebar coupler enhances the overall structural integrity of reinforced concrete constructions. The rebar coupler is designed to meet or exceed relevant governmental requirements and standards, such as those articulated in ACC133 and CalTrans CT670 test methods.

An embodiment of the invention employs a unique mechanism for creating opposing force, which is crucial for ensuring a secure, slip-resistant connection. This mechanism relies on the interaction between the internal cylinder, the tightening members, and the tapered bores of the male and female external housings. As the external housings are tightened, they create a force that pushes the tightening members towards the center of the rebar coupler, while the internal cylinder provides an opposing force. This combination of forces, along with the spring action and tapered surfaces, creates a robust locking mechanism that securely grips the rebar and minimizes or eliminates slip.

The rebar coupler offers significant advantages over existing products in the market, such as the Lockshear Bolt Coupler and Threaded Coupler, by eliminating the need for heavy equipment, extensive rebar preparation, and complex installation procedures. Its design allows for easy insertion of rebar without the need for threading or other modifications, making it particularly advantageous for use at heights or in challenging construction environments.

In summary, the rebar coupler provides a comprehensive solution to many of the challenges faced in rebar coupling, offering a secure, slip-resistant connection that can be achieved with minimal effort and equipment. Its emphasis on simplicity, versatility, and compliance with stringent standards makes it a valuable innovation in the field of reinforced concrete construction.

DETAILED DESCRIPTION OF THE INVENTION

Figure 1:
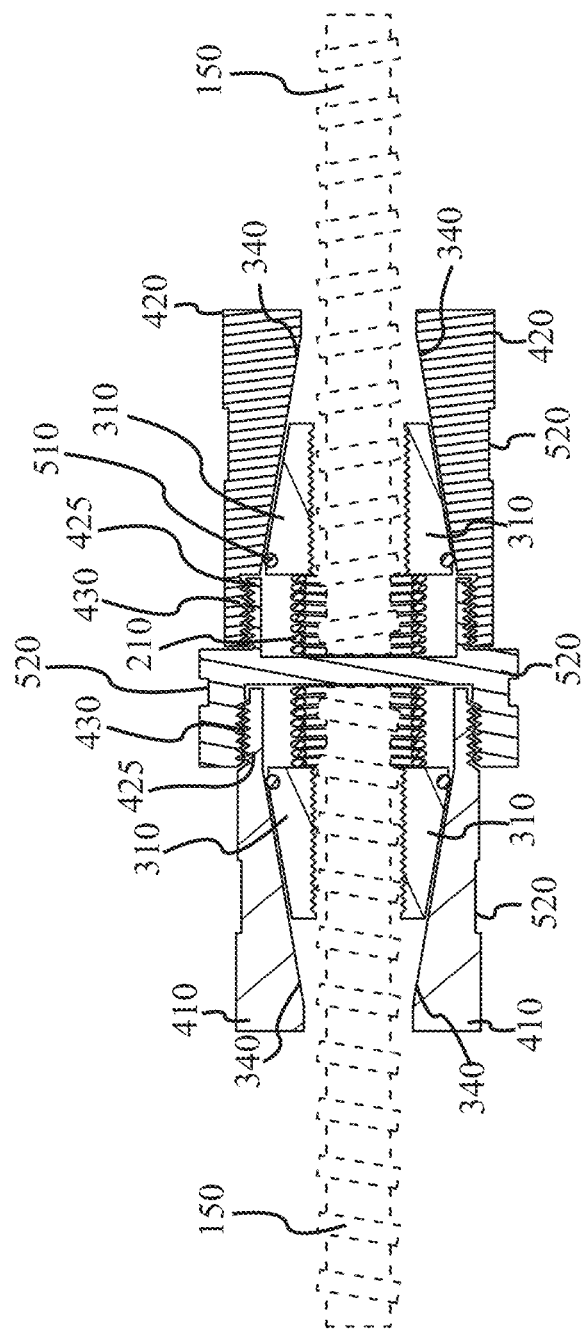
FIG. 1 is a cross-sectional view of a three primary body configuration rebar coupler with a stop plate built into the middle housing piece, showing the internal components and their arrangement.

Embodiments of the present invention relates to an improved rebar coupler that can be configured in either a two primary body configuration or a three primary body configuration. Both configuration embodiments aim to provide a secure, slip-resistant connection between two pieces of rebar while minimizing the effort required for installation.

In the two primary body configuration, the rebar coupler comprises a male threaded external housing and a female threaded external housing. These two primary bodies house the internal components necessary for gripping and securing the rebar pieces. This configuration includes an internal cylinder, a first set of tightening members and a second set of tightening members (each comprising a plurality of wedges), one or more elastic support rings, and at least one spring extending through the internal cylinder. The male and female threaded external housings are designed to be directly screw-coupled, eliminating the need for a separate coupler body or tightening unit.

The three primary body configuration builds upon the two-piece design by introducing a central housing piece 500 between the male and female threaded external housings. This additional component allows for variations in the internal structure, such as the placement of the stop plate. The three primary body configuration can be implemented in several ways, including: (1) with a stop plate built into the middle housing piece, (2) with no stop plate and an internal through cylinder, or (3) with a stop plate within the internal cylinder. This configuration maintains the core functionality of the two-piece design while offering additional flexibility in the coupler's internal arrangement.

Both configurations of the rebar coupler are designed to simplify the process of joining two pieces of rebar while minimizing or eliminating the potential for slippage. The invention aims to address the challenges associated with existing rebar coupling methods, particularly in demanding construction situations, by providing a secure connection that can be achieved with minimal effort and equipment.

The rebar coupler invention addresses several key challenges associated with existing rebar coupling methods, particularly in demanding construction situations. By simplifying the process of joining two pieces of rebar while minimizing or eliminating the potential for slippage, the invention provides significant improvements in safety, efficiency, and structural integrity.

One of the primary benefits of this invention in various embodiments is the reduction in manual labor and injury risk. Traditional rebar coupling methods often require extensive manual labor and heavy equipment, which can pose significant safety risks, especially when working at heights. The rebar coupler minimizes these risks by allowing for a simpler, more streamlined installation process that can be performed with minimal equipment.

The "one-touch" style design of the rebar coupler allows for coaxial placement of two separate pieces of rebar into the opposing ends of the device. This significantly simplifies the installation process, eliminating the need for complex threading or welding procedures that are often time-consuming and require specialized skills. The design enables a single person to handle and install the coupler, reducing labor requirements and improving efficiency on construction sites.

The "one-touch" style design refers to a simplified method of connecting rebar using the coupler in accordance with various embodiments. In this approach, the user can insert two separate pieces of rebar into the opposing ends of the device in a single, straightforward motion. This design eliminates the need for complex procedures such as threading, welding, or extensive manual manipulation of the rebar. The concept aims to provide a secure connection between rebar pieces with minimal effort, reducing the time and skill required for installation. The "one-touch" design is a key feature of the invention, addressing the challenges associated with traditional rebar coupling methods by offering a more efficient and user-friendly solution that can be implemented by a single person, even in demanding construction situations.

A critical aspect of the invention in various embodiments is its ability to minimize or eliminate slip between the coupled rebar pieces. This addresses a significant issue in existing rebar coupling methods, particularly in applications subject to cyclical loading, such as bridges and transportation structures. The design ensures compliance with stringent regulatory requirements, including the CT670 California regulation, which is known for its strict standards regarding slip in rebar connections.

The rebar coupler's versatility is another key advantage in accordance with various embodiments. In various embodiments, the rebar coupler is configured to accommodate various rebar sizes, ranging from #3 nominal rebar, which comprises a diameter from of approximately 0.375 inches, up to #18 nominal rebar which comprises a diameter of approximately 2.25 inches optionally by utilizing a limited number of coupler sizes, simplifying inventory management and reducing potential errors. In an exemplary embodiment, to accommodate additional rebar sizes being used for concrete reinforcement, then additional sizes of this same coupler embodiment are scaled in an embodiment to accommodate such sizes as well.

By ensuring a secure connection and minimizing slip, the rebar coupler enhances the overall structural integrity of reinforced concrete constructions. This is particularly important in applications subject to dynamic loads or seismic activity, where the stability and durability of rebar connections are crucial.

The invention in an embodiment is designed to meet or exceed relevant governmental requirements and standards, such as those articulated in ACC133 (Acceptance Criteria for Mechanical Connector Systems for Steel Reinforcing Bars). This ensures its suitability for use in a wide range of construction projects, including those with stringent regulatory oversight.

In accordance with various embodiments, the rebar coupler invention as described herein is designed to comply with the stringent CalTrans CT670 test methods, which are crucial for ensuring the structural integrity and safety of rebar connections, particularly in transportation-related construction projects. The CT670 test method specifically focuses on evaluating the slip characteristics of rebar couplers under cyclic loading conditions. The test procedure involves applying bidirectional loads to the rebar coupler assembly over multiple cycles at a certain percentage of the capacity of the rebar or junction itself. After the cyclic loading, a compression load is applied, and a measurement device is set to zero. Then, a tension load (typically around 90% of the yield force) is applied, and the slip is measured.

The key criterion for passing the CT670 test is that the measured slip must be below a specified threshold, which varies depending on the size of the rebar being tested. The test is typically performed on three pieces of each rebar size, and all three samples must meet the slip requirements to pass. The rebar coupler invention in accordance with its embodiments addresses the CT670 requirements through its innovative design features. The self-gripping mechanism, comprising the tightening members 310 and the tapered bores 430, provides a secure grip on the rebar that minimizes potential for slip. The internal cylinder 200 in a configuration embodiment or stop plate in an alternative configuration embodiment work to create an opposing force that locks the rebar coupler into its fully tightened state, further reducing the likelihood of slip under cyclic loading. In accordance with exemplary embodiments comprising configurations utilizing an internal through cylinder, a measured length of a first rebar is inserted into one side of the coupler and then a second piece of rebar is inserted in the opposite side of the coupler until it meets the first rebar inserted from the other side.

The design allows for the elimination of any gap between the rebar ends and the internal cylinder 200, which comprises a center stop in its primary configuration. This feature helps to minimize or potentially eliminate slip, even under the cyclic loading conditions simulated in the CT670 test. The rebar coupler's ability to be scaled to accommodate various rebar sizes (from #3 to #18 nominal rebar) with a minimal number of size configurations ensures that it can meet the CT670 requirements across a wide range of rebar diameters commonly used in transportation construction.

By meeting the CT670 test requirements, the rebar coupler invention in accordance with its embodiments addresses a critical need in the construction industry, particularly for transportation-related projects such as bridges, where the cyclic nature of loading can create significant challenges for maintaining the structural integrity of rebar connections over time. This compliance with CT670 standards potentially positions the invention for approval by Departments of Transportation across various states.

The coupling process in accordance with various embodiments requires minimal external equipment, primarily relying on standard pipe wrenches (or other similar wrenches) for tightening. This reduces the need for specialized tools and equipment on construction sites, leading to potential cost savings and improved logistics. The simplified process also contributes to reduced working time and improved constructability, addressing challenges associated with conventional methods like lap jointing or welding.

The mechanism of creating opposing force is a crucial aspect of the rebar coupler invention in its various embodiments that ensures a secure, slip-resistant connection. This mechanism primarily relies on the interaction between the internal cylinder 200, the tightening members 310 and 320, and the tapered bores 430 of the male and female external housings.

As the male threaded external housing 410 and female threaded external housing 420 are tightened together, they create a force that pushes the tightening members (wedges) towards the center of the rebar coupler. The internal cylinder 200 is sized such that it prevents the facing aspects of the male and female external cylinders from touching directly.

This design ensures that as the external housings are tightened, they continuously exert force on the tightening members.

The internal cylinder 200 plays a critical role in this process by providing an opposing force against which the tightening members are pressed. As the external housings are tightened, the tightening members are forced inward by the tapered bores 430, but they encounter resistance from the internal cylinder 200. This opposing force causes the wedges to lock firmly against the inserted rebar.

The spring 210 also contributes to this mechanism by providing an initial outward force on the tightening members. As the rebar is inserted and the coupler is tightened, the spring compresses, allowing the wedges to open up and accommodate the rebar. However, it continues to exert pressure, ensuring there is always some force pushing the wedges outward.

The tapered design of the bores 430 and the corresponding taper on the exterior of the wedges (tightening members) are crucial for this mechanism. As the external housings are tightened, the wedges are forced to slide along these tapered surfaces, which converts the axial tightening force into a radial gripping force on the rebar.

This combination of forces—the inward force from the tightening of the external housings, the outward force from the spring and internal cylinder, and the radial force created by the tapered surfaces-creates a robust locking mechanism in accordance with various embodiments of the invention. This mechanism ensures that the rebar is securely gripped and that any potential for slip is minimized or eliminated, even under cyclic loading conditions.

The effectiveness of this opposing force mechanism is what allows the rebar coupler to achieve a fully tightened state where slip is effectively eliminated. This is a key advantage over other designs that may rely solely on friction or less sophisticated gripping mechanisms.

Two Primary Body Configuration

Reference will now be made in detail to a rebar coupler 100 according to the present invention, embodiments of which are illustrated in the accompanying drawings.

Figure 17:
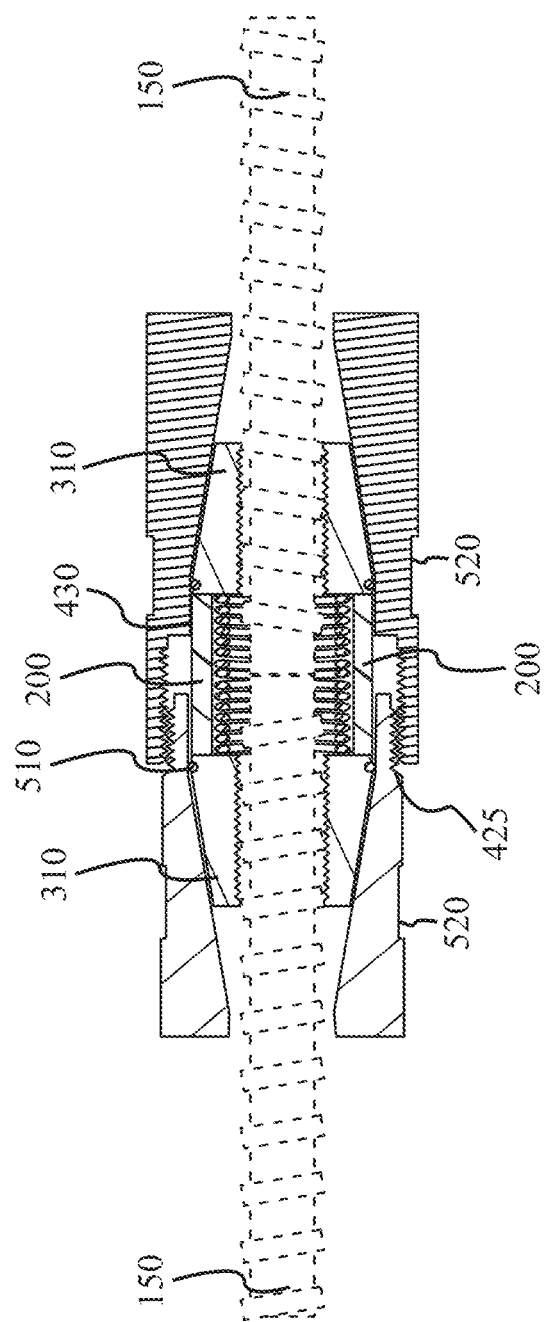
FIG. 17 is a cross-sectional view of a two primary body configuration rebar coupler with no stop plate and an internal through cylinder, showing the internal components and their arrangement.
Figure 18:
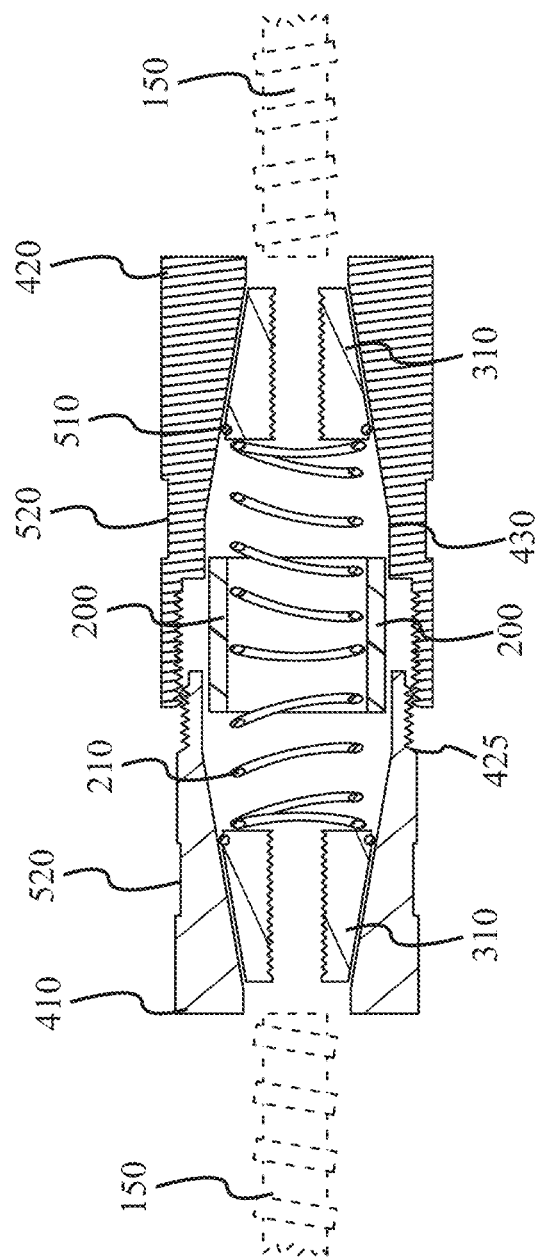
FIG. 18 is a longitudinal cross-sectional view of the two primary body configuration rebar coupler depicted in FIG. 17, illustrating the arrangement of internal components and the insertion of rebar pieces.
Figure 19:
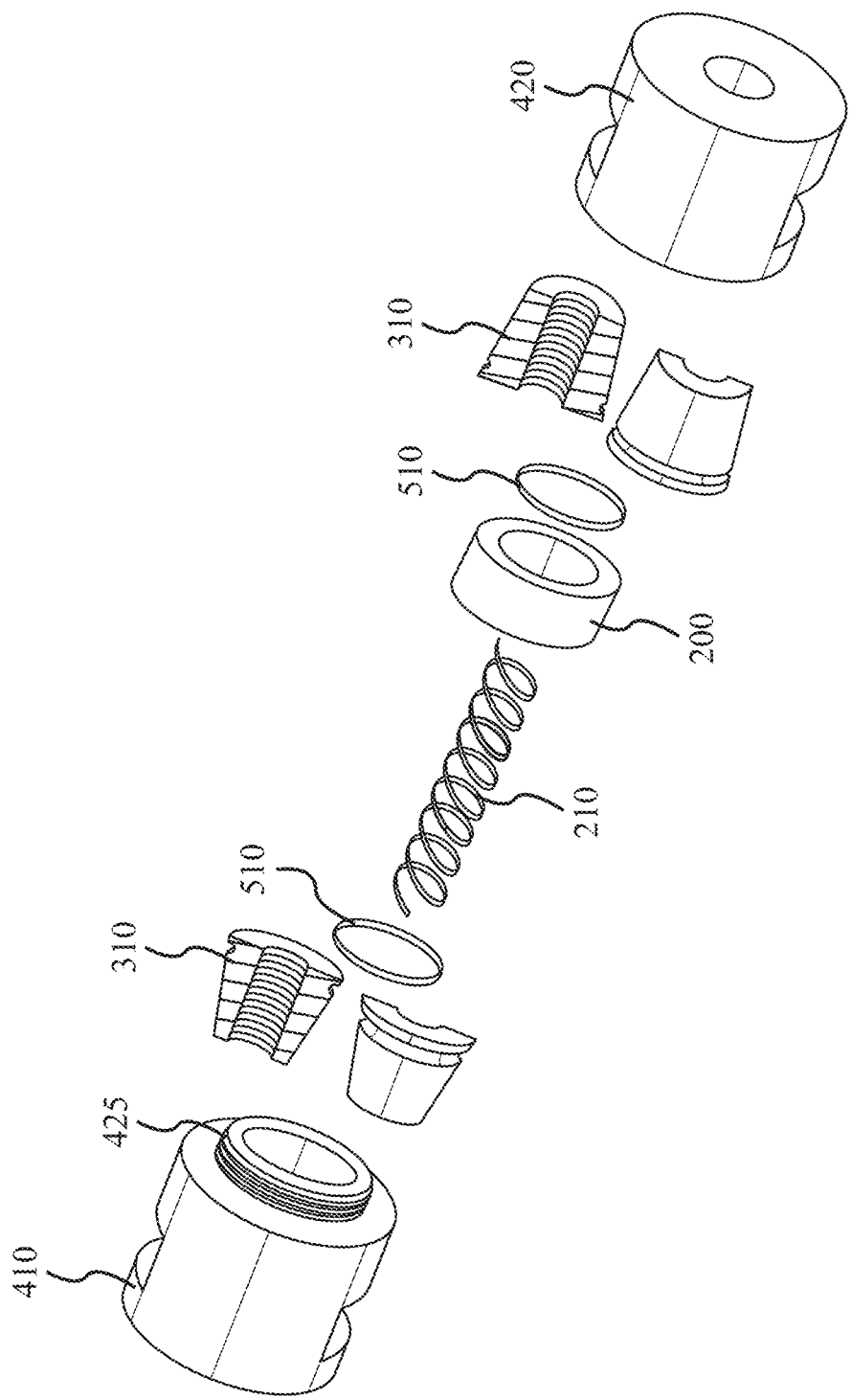
FIG. 19 is an exploded view of the two primary body configuration rebar coupler with no stop plate and an internal through cylinder, showing the individual components and their relative positions in the assembly.
Figure 20:
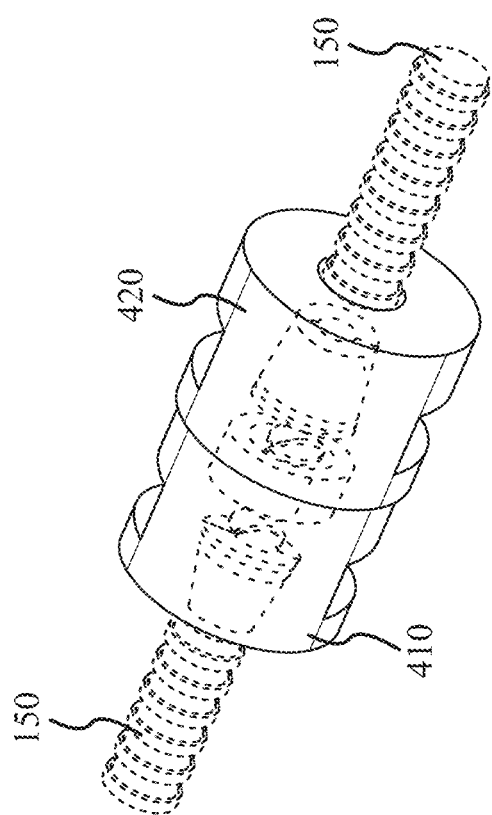
FIG. 20 is another view of the two primary body configuration rebar coupler with no stop plate and an internal through cylinder, providing additional detail on the internal structure.
Figure 21:
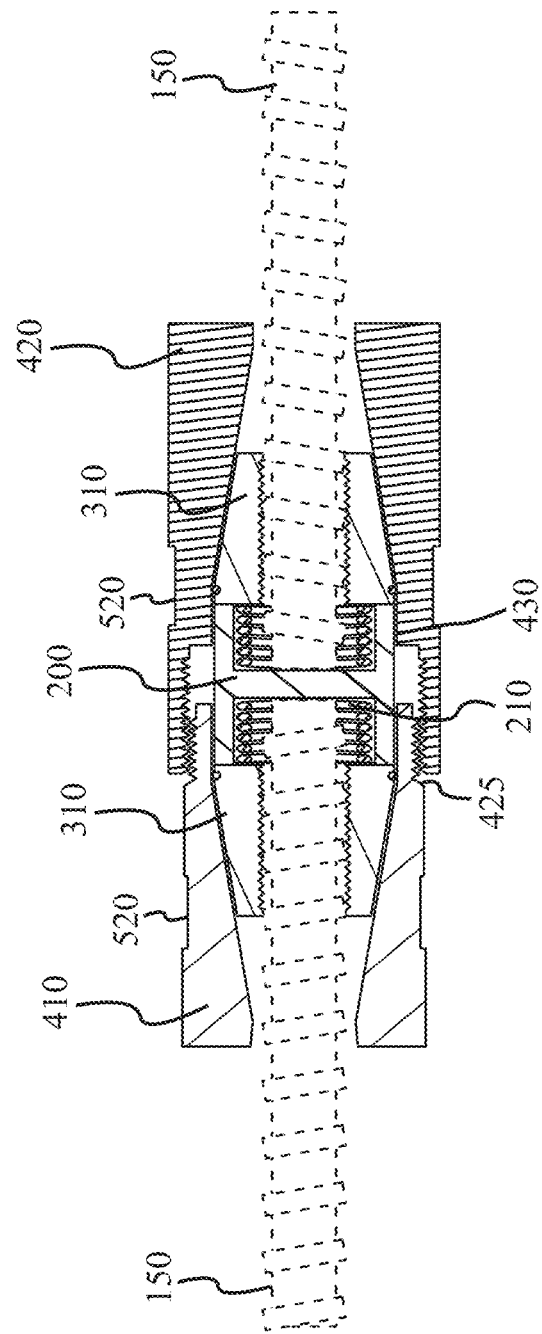
FIG. 21 is a cross-sectional view of a two primary body configuration rebar coupler with a stop plate within the internal cylinder, showing the internal components and their arrangement.
Figure 22:
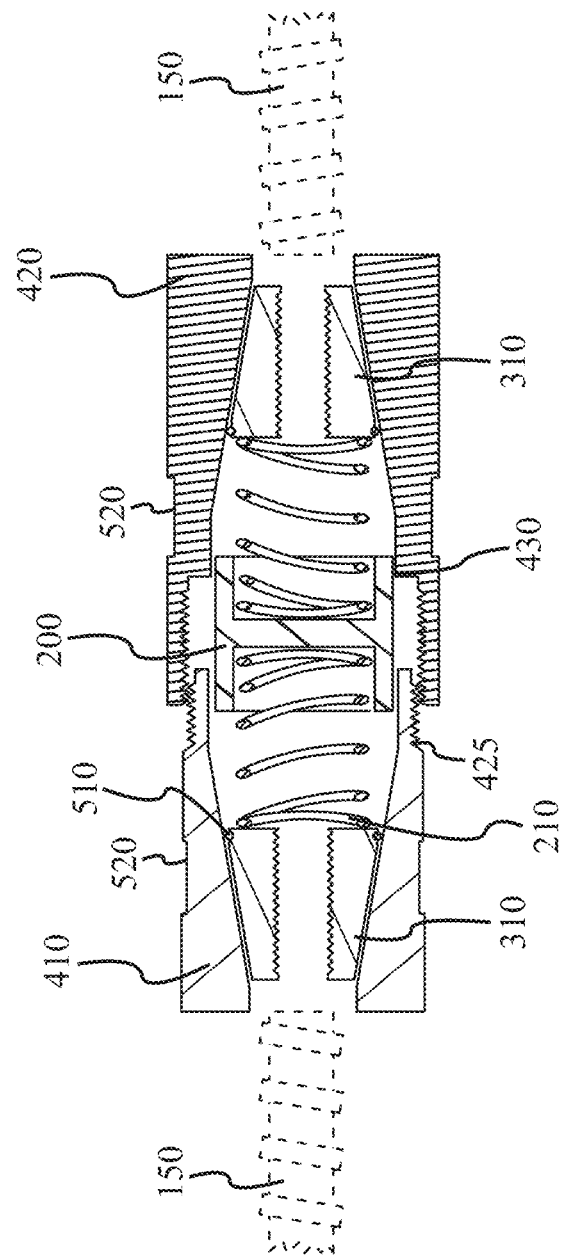
FIG. 22 is a longitudinal cross-sectional view of the two primary body configuration rebar coupler depicted in FIG. 21, illustrating the arrangement of internal components and the insertion of rebar pieces.
Figure 23:
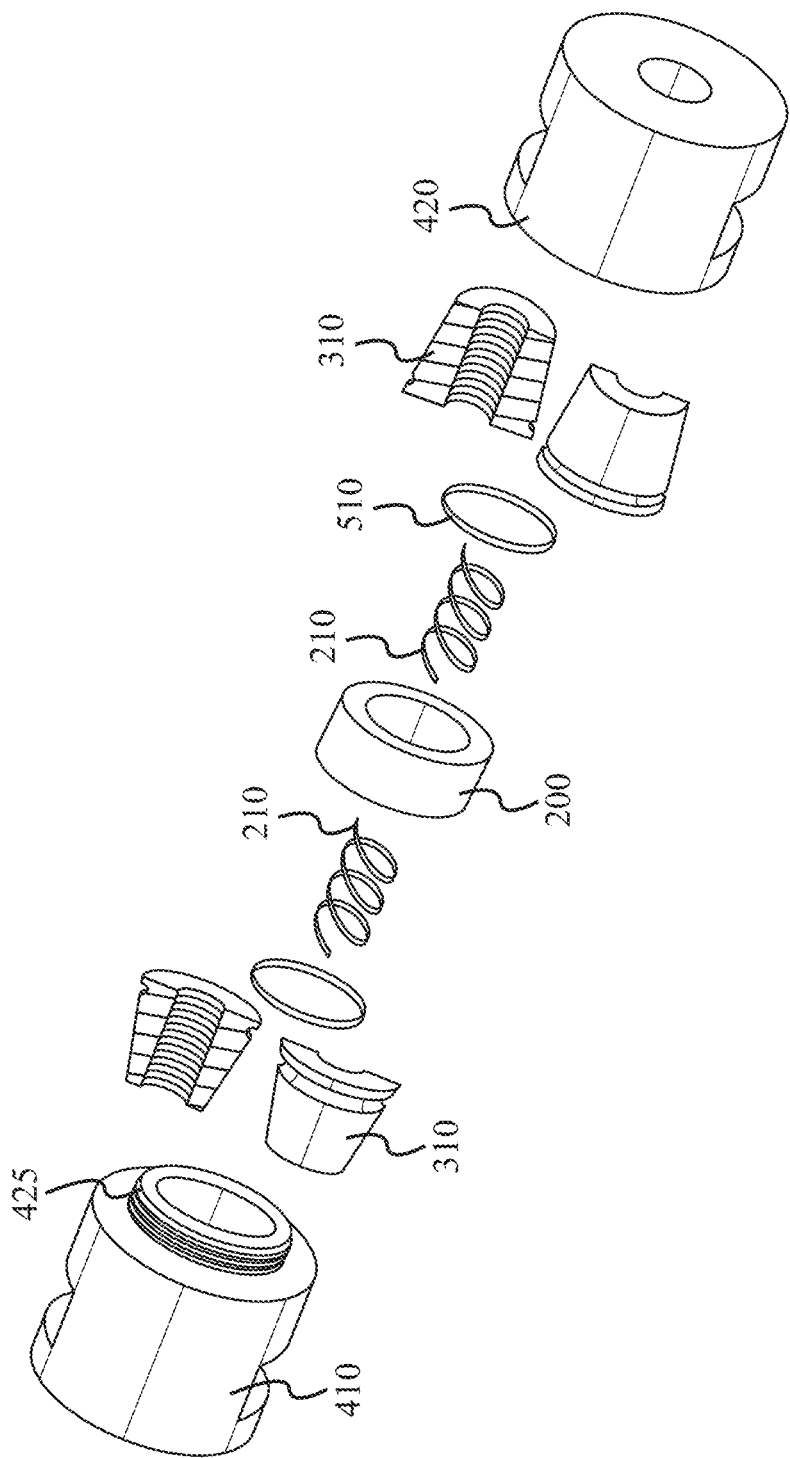
FIG. 23 is an exploded view of the two primary body configuration rebar coupler with a stop plate within the internal cylinder, showing the individual components and their relative positions in the assembly.
Figure 24:
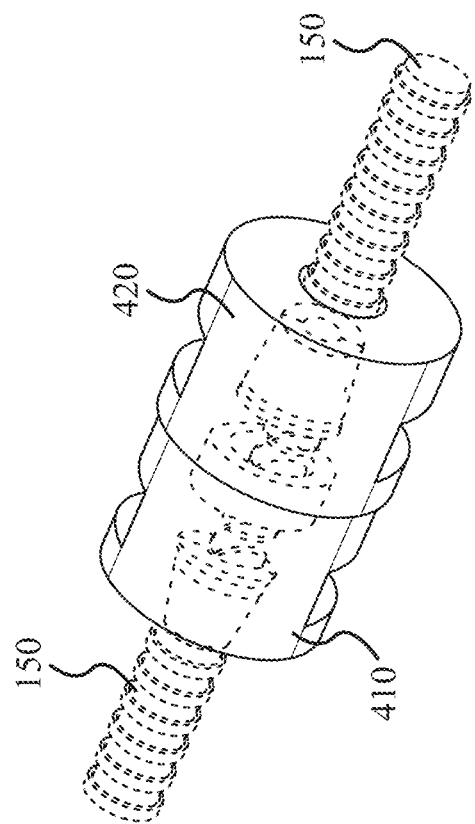
FIG. 24 is another view of the two primary body configuration rebar coupler with a stop plate within the internal cylinder, providing additional detail on the internal structure.

In accordance with an intended use of an embodiment of the two primary body configuration as depicted by FIG. 17, a length of a first piece of rebar is inserted into one side of the couple 100r and then a second piece of rebar is inserted in the opposite side of the coupler until it meets the first rebar inserted from the other side of the coupler 100.

The preferred embodiment of the rebar coupler 100 described herein comprises an internal cylinder 200, a first set of tightening members 310 and a second set of tightening members 320 each comprising a plurality of wedges, one or more elastic support rings 510, a male threaded external housing 410, a female threaded external housing 420

The preferred embodiment of the rebar coupler 100 comprises an internal cylinder 200. In association with the configuration of the preferred embodiment, the placement of the internal cylinder 200 within facilitates the transfer of opposite force upon the plurality of wedges. In various configurations, the internal cylinder 200 has substantially smooth exterior and interior aspects and comprises steel.

In the preferred embodiment, the internal cylinder 200 critically provides opposing force necessary to lock the rebar coupler 100 into its fully tightened state and thereby seating upon the two inserted pieces of rebar during the intended use without the potential for slippage, an advantageous improvement over prior art attempts.

The preferred embodiment of the invention comprises a first set of tightening members 310 and a second set of tightening members 320. Each of the first set of tightening members 310 and second set of tightening members 320 comprises a plurality of wedges. In various embodiments, each of the first set of tightening members 310 and the second set of tightening members 320 further comprises one or more elastic support ring(s) 510. Each of the first set of tightening members 310 and the second set of tightening members 320 are supported by an elastic support ring 510 so as to maintain the arrangement of the wedges comprising each of the first set of tightening members 310 and the second set of tightening members 320 in the circumferential direction. The outer circumferential surfaces of each set of tightening members in an exemplary embodiment are provided with one or more support grooves for preventing the one or more elastic support rings 510 from being dislodged from either the first set of tightening members 310 or second set of tightening members 320 when either is displaced. The each of plurality of wedges comprises one or more support groove(s) transversing the exterior facing aspect of the wedges in association with the configuration of the preferred embodiment. In association with the preferred configuration, each of the elastic support rings 510 is placed within one or more support groove(s) to retain the plurality of wedges together. In the preferred configuration, the exterior aspect of each of the wedges comprising either the first set of tightening members 310 or the second set of tightening members 320 forms an exterior taper with an angle corresponding to the angle of internal tapering of either the male threaded external housing 410 or female threaded external housing 420 against which either the first set of tightening members 310 or second set of tightening members 320 abuts against.

Embodiments of the invention comprise one or two springs 210. In configurations comprising a central piece separating the interior aspect of the internal cylinder 200, or dividing the internal cylinder 200 into two cylinders of corresponding shapes, such embodiments comprise two springs 210. Other embodiments comprise a single spring 210.

In various embodiments, the spring 210 (whether in a single spring or multiple spring configuration) exerts sufficient force such to seat each of the first set of tightening members 310 and the second set of tightening members 320 into the tapered bore once following the insertion of the rebar in association with intended uses of the rebar coupler 100. In association with the preferred embodiment, the spring 210 sets the initial position of each of the first set of tightening members 310 and the second set of tightening members 320. In association with preferred uses, the spring 210 biases each of the first set of tightening members 310 and second set of tightening members 320 members toward the outward position prior to the insertion of rebar into the rebar coupler 100. In association with the preferred method of use, as a piece of rebar 150 is inserted from either side of the rebar coupler 100, the spring 210 is compressed. In various embodiments, the outer diameter of the spring 210 is no larger than the outer diameter of each of the first set of tightening members 310 and the second set of tightening members 320. The inner diameter of the spring 210 is also required to be no smaller than the outer diameter of the rebar pieces being joined. In such way, the spring 210 continuously places force in the outward direction upon each of the first set of tightening members 310 and the second set of tightening members 320 to provide the desired orientations of each of the first set of tightening members 310 and the second set of tightening members 320 in association with the preferred embodiment. Further in association with the preferred method of use, as the rebar is being inserted into either end of the coupler 100, the spring 210 continues to exert outward force on the first set of tightening members 310 and the second set of tightening members 320 in association with the preferred embodiment. And as the male threaded external housing 410 and female threaded external housing 420 are tightened together, the spring 210 further compresses and continues to exert force on the first set of tightening members 310 and the second set of tightening members 320 in association with the preferred embodiment. As the spring 210 compresses upon either set of tightening members, the wedges comprising each set of tightening members that the spring 210 compresses upon expand away from each other thereby providing an aperture large enough for the rebar 150 to fit within between the wedges of either the first set of tightening members 310 or the second set of tightening members 320 at a point substantially distal from the points at which the spring 210 applies force to the wedges.

Figure 2:
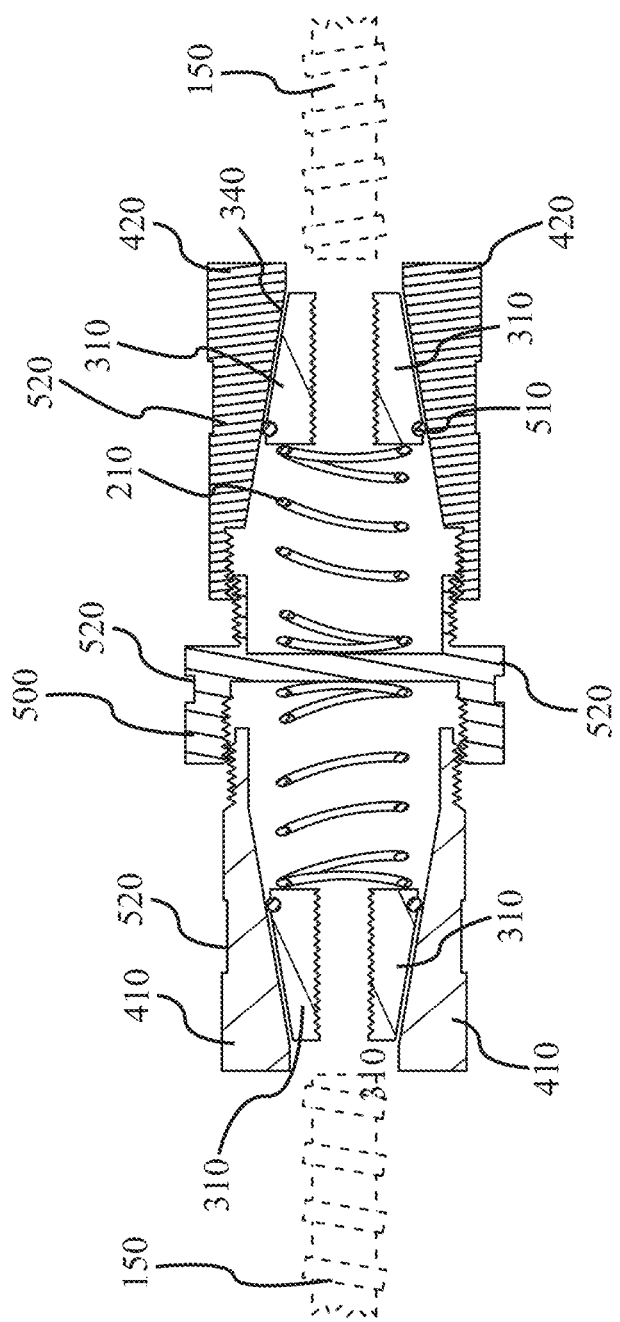
FIG. 2 is a longitudinal cross-sectional view of the three primary body configuration rebar coupler depicted in FIG. 1, illustrating the arrangement of internal components and the insertion of rebar pieces.
Figure 3:
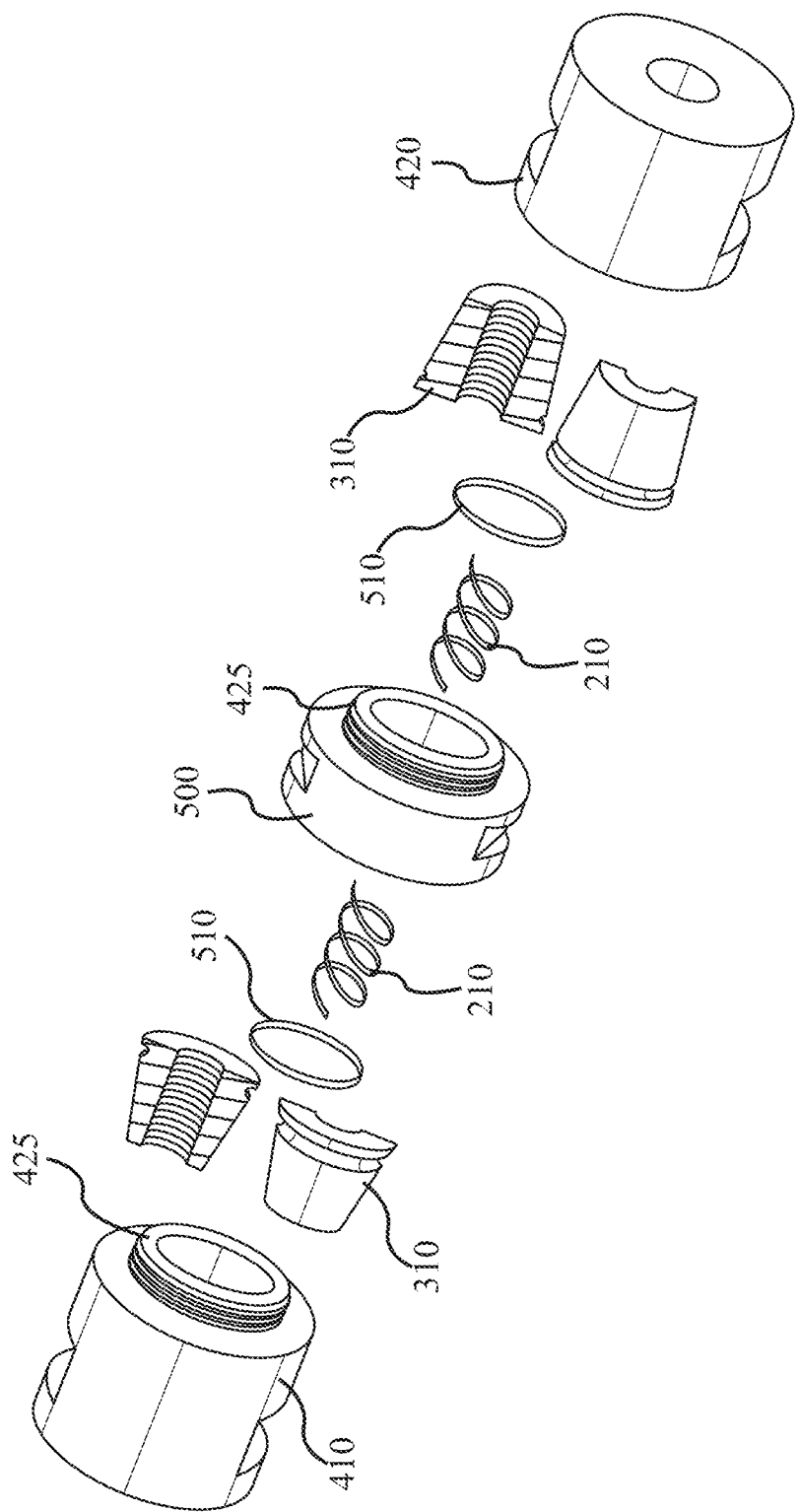
FIG. 3 is an exploded view of the three primary body configuration rebar coupler with a stop plate built into the middle housing piece, showing the individual components and their relative positions in the assembly.
Figure 4:
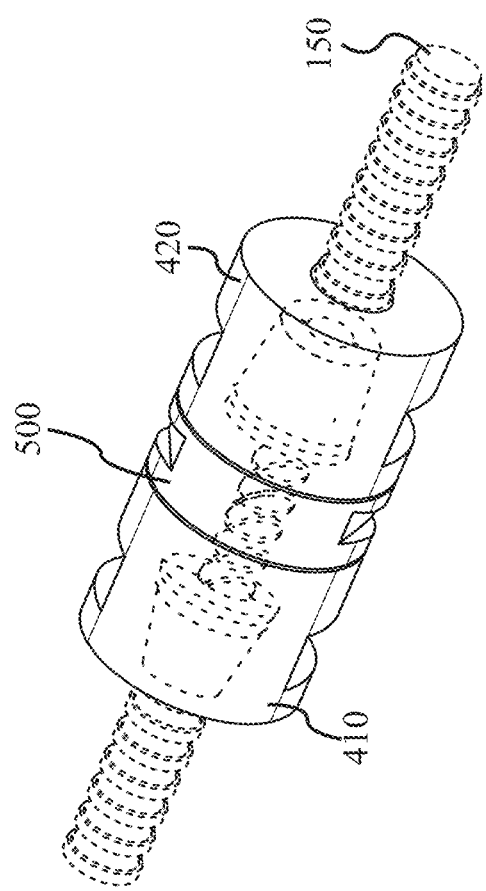
FIG. 4 is another view of the three primary body configuration rebar coupler with a stop plate built into the middle housing piece, providing additional detail on the internal structure.

Embodiments of the rebar coupler 100 comprise a male threaded external housing 410 and a female threaded external housing 410. Each of the male threaded external housing 410 and female threaded external housing 420 comprise a partially tapered bore 430 upon their internal aspects, as depicted in FIGS. 1 and 2. In association with various embodiments, the tapered bore 430 comprises a tapering angle selected from within the range of 0.1 and 89.9 degrees, but in association with preferred embodiments, the tapering of the tapered bore 430 is of an angle selected from within the range of approximately 12-15 degrees.

In association with the preferred method of use, the threading 440 of the male threaded external housing 410 and the corresponding threading 425 of the female threaded external housing 410, when secured upon one another via applied torque, provides a substantially continuous transfer of force from each of the male threaded external housing 410 and a female threaded external housing 420 to the corresponding set of tightening members by removing the space available to the internal cylinder 200 thereby causing it to exert an outward force on the first set of tightening members 310 and the second set of tightening members 320 in association with the preferred embodiment. The continuous transfer of force is provided due to the tapered bore 430 of each of the male threaded external housing 410 and the female threaded external housing 420 acting upon the exterior aspects of the abutting first set of tightening members 310 or second set of tightening members 320, thereby forcing the abutting first set of tightening members 310 or second set of tightening members 320 to the center of the rebar coupler 100 while clamping down upon the inserted rebar 150 as the male threaded external housing 410 and the female threaded external housing 420 are secured together via the external application of torque. In association with the preferred embodiment, the torque is applied upon either or both of the male threaded external housing 410 and the female threaded external housing 420 via one or two pipe wrenches during intended uses. In association with such uses, each of the first set of tightening members 310 and second set of tightening members 320 are forced toward the center of the rebar coupler 100 when two pieces of rebar are inserted into the rebar coupler 100 from opposing entry points, and as the male threaded external housing 410 and the female threaded external housing 420 are torqued together. Another result of such efforts is a clamping force placed upon each inserted piece of rebar, due to the sliding motion of the tapered bore 420 of the male threaded external housing 410 or female threaded external housing 420 upon the exterior taper 340 of either of the first set of tightening members 310 and the second set of tightening members 320 and the corresponding and abutting tapered bore 430 of either the male threaded external housing 410 or the female threaded external housing 410. As the exterior aspects, specifically the exterior taper 340, of each of the first set of tightening members 310 or second set of tightening members 320 are slidably engaged with the interior aspects, namely the tapered bore 430, of the male threaded external housing 410 or female threaded external housing 410, during the intended use each of the first set of tightening members 310 and second set of tightening members 320 is moved to provide tightening force to an inserted rebar 150 via the gripping aspect 350 located at the interior aspects of each of the wedges comprising the first set of tightening members 310 and second set of tightening members 320 as the male threaded external housing 410 and female threaded external housing 420 are torqued to form a secure connection upon a piece of rebar 150 inserted between the wedges. The preferred configuration therefore provides for the male threaded external housing 410 and the female threaded external housing 420 to be directly screw-coupled without the need for a separate coupler body or tightening unit and the associated drawbacks, including additional parts and precision requirements, an advantageous improvement over prior art attempts.

The male threaded external housing 410 comprises a male threaded protrusion 416. The threading 415 of the male threaded protrusion 416 is configured to correspond to the threading 425 of the female threaded receptacle 426. In association with various embodiments, the threading 415 of the male threaded protrusion 416 faces the exterior of the rebar coupler 100.

The female threaded external housing 420 comprises a female threaded receptacle 426. In association with various embodiments, the threading 425 of the female threaded external housing 420 substantially faces the interior of the rebar coupler 100.

In an embodiment, the internal cylinder 200 provides a stop, such that the vertical exterior face of the male threaded external housing 417 and the vertical face of the female threaded external housing could never make direct contact in association with the preferred configuration of the rebar coupler 100. As such, during intended methods of use, the rebar coupler 100 will achieve a fully tightened state, during which two separate pieces of rebar 150 each inserted into the rebar coupler 100 from opposing aspects are considered to be adequately coupled, prior to the vertical exterior face of the male threaded external housing 417 and the vertical face of the female threaded external housing directly coming into contact with one another.

In association with various embodiments, the rebar coupler 100 can accommodate rebar of different sizes with no modification required to the rebar coupler 100. The combination of the fit between the first set of tightening members 310 and second set of tightening members 320 and the internal taper 430, would be sufficiently large to accommodate an upper end size of rebar (i.e. #18 rebar in nominal sizing) in an exemplary size of the embodiments of the invention. The first set of tightening members 310 and second set of tightening members 320 would likewise have the capability to seat at a smaller diameter of the taper 430 to a smaller size of rebar (i.e. #3 rebar in nominal sizing) in an exemplary size of the embodiments of the invention. In association with the preferred method of use, the lower the rebar seats into the bore, the taper is smaller. A larger piece of rebar will expand the first set of tightening members 310 and second set of tightening members 320 to allow the inserted rebar to seat higher into the internal taper 430 with a larger diameter. The preferred embodiment advantageously provides a sufficient amount of room between the smallest diameter of internal taper 430 to the largest diameter of internal taper 430 to accommodate rebar of different sizes from within the range of #3 nominal rebar (approximately 0.375 inch diameter rebar) to #18 nominal rebar (approximately 2.25 inch diameter rebar) with a minimal number of reconfigurations and resizing of the components.

In association with the preferred embodiment of the rebar coupler 100, the preferred method of use comprises the following steps. First, the step of inserting a first piece of rebar into the aperture at one end of the rebar coupler 100 until it meets the internal cylinder 200 as a stop is performed. Second, the step of inserting a second piece of rebar into the aperture at opposing end of the rebar coupler 100 until it meets the internal cylinder 200 as a stop is performed. Third, the steps of attaching a pipe wrench (or other sufficient wrench capable of applying torque) to the non-threaded aspect of the male threaded external housing 410 and attaching a pipe wrench (or other sufficient wrench capable of applying torque) to the female threaded external housing 420 are performed. Finally, force in opposing directions is applied to each of the applied pipe wrenches (or other sufficient wrenches) in the direction necessary to tighten the male threaded external housing 410 and female threaded external housing 420 members as necessary to seat the internal tapering of the first set of tightening members and the second set of tightening members onto each of the inserted rebars. The present inventor has recognized that following these steps, the two inserted rebars are advantageously coupled together with minimal or no slippage.

In association with the preferred embodiment, the present inventor has noted that the rebar coupler 100 provides the capability for compliance with the most stringent relevant regulations. Following the insertion of each of the two ends into the rebar coupler 100 from opposing sides until they make contact with the internal cylinder 200, and the subsequent tightening of the male threaded external housing 410 and female threaded external housing 420 to one another, the gap between the rebar ends and the internal cylinder 200 as center stop is eliminated, thereby imparting additional force to fully seat each of the first set of tightening members 310 and second set of tightening members 320 upon each corresponding piece of rebar, thereby removing and eliminating any potential for slippage. In the case where there still is no contact between the rebar and the internal cylinder 200 as the center stop, the torque would put enough force on each of the first set of tightening members 310 and second set of tightening members 320 such that when they are seated into the tapered bores, enough grip strength from each of the first set of tightening members 310 and second set of tightening members 320 upon each corresponding piece of rebar would to eliminate any potential for significant slippage. The present inventor has noted that the resultant removal of slip would satisfy the most stringent regulatory requirements, including especially the requirements associated with the CT670 California regulation, due to the elimination or minimization of slip to very miniscule amounts. In the preferred embodiment, the rebar coupler 100, following tightening, would eliminate slip to the point where it would meet or exceed the California requirement, and may eliminate slip completely in associated with preferred uses.

Three Primary Body Configuration

The three primary body configuration embodiments of the rebar coupler builds upon the two-piece design embodiments, offering enhanced flexibility and potential advantages in certain applications. This three primary body configuration incorporates aspects of the two primary body configuration and further comprises a central housing piece 500 between the male threaded external housing 410 and female threaded external housing 420, resulting in a three-piece outer design, as shown in FIGS. 1 through 12.

The key components of the three primary body configuration include a male threaded external housing 410, a central housing piece 500, and a female threaded external housing 420, along with internal components such as the tightening members 310, spring(s) 210, and internal cylinder 200. These components are illustrated in various configurations throughout FIGS. 1-12.

One of the primary advantages of the three-piece design embodiment is the ability to incorporate the stopper directly into the middle piece, as depicted in FIGS. 1-4. This configuration allows for variations in the internal structure, providing more options for optimizing the coupler's performance and manufacturing process.

The three primary body configuration in accordance with various embodiments is implemented in several ways, including as follows: with a stop plate built into the middle housing piece, shown in FIGS. 1-4; with no stop plate and an internal through cylinder 200, as depicted in FIGS. 5-8; and with a stop plate within the internal cylinder 200, illustrated in FIGS. 9-12.

Each of these variations maintains the core functionality of the original two-piece design embodiments while offering additional flexibility in the coupler's internal arrangement. This flexibility may provide advantages in terms of manufacturing, assembly, or performance in specific applications.

Despite the changes in the external configuration, the three-piece design retains the key features and benefits of the original concept. It still aims to provide a self-gripping, no-slip rebar coupler that can be handled by a single person, like the two primary body configuration embodiments. The emphasis on eliminating slip remains a critical aspect of the invention in accordance with either the two primary body configuration or the three primary body configuration embodiments, addressing a significant issue in existing rebar coupling methods, particularly beneficial in accordance with transportation construction applications and structures subject to cyclical loading.

Figure 5:
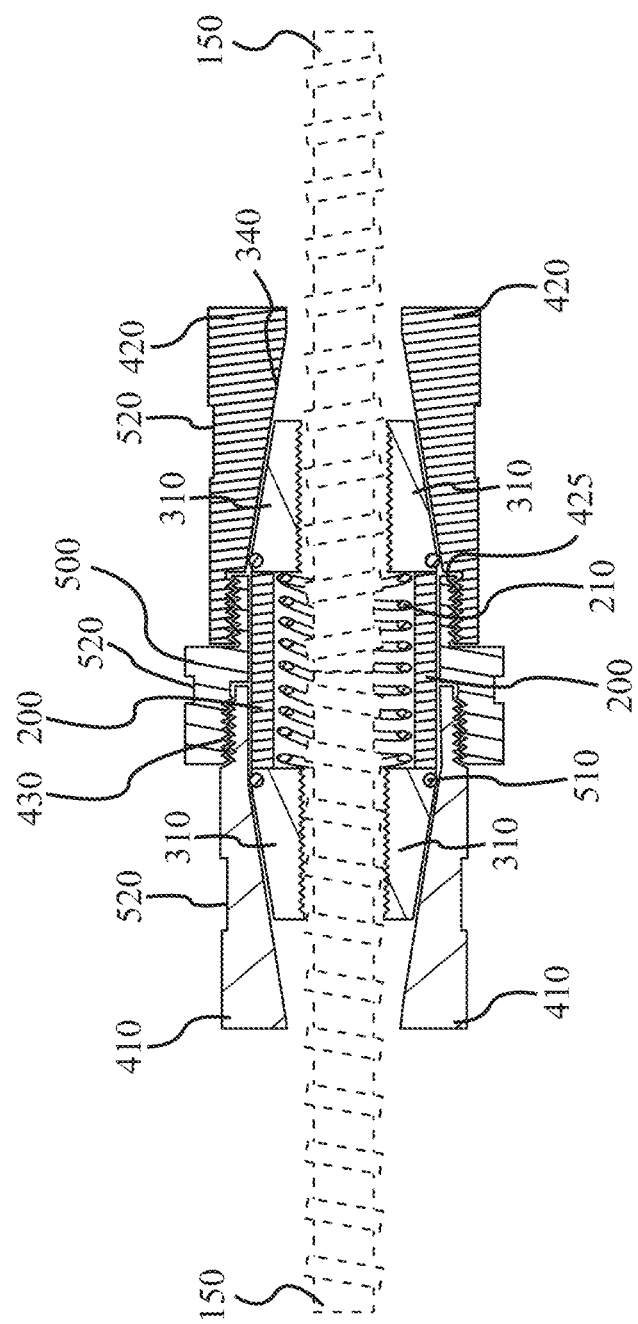
FIG. 5 is a cross-sectional view of a three primary body configuration rebar coupler with no stop plate and an internal through cylinder, showing the internal components and their arrangement.
Figure 6:
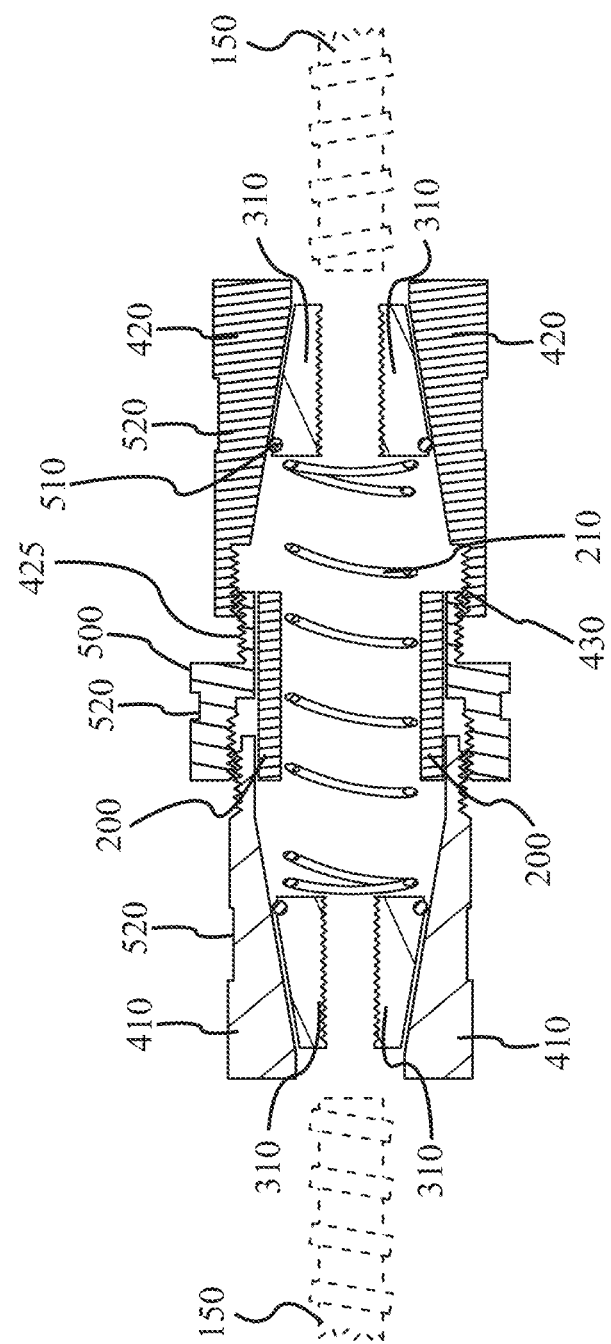
FIG. 6 is a longitudinal cross-sectional view of the three primary body configuration rebar coupler depicted in FIG. 5, illustrating the arrangement of internal components and the insertion of rebar pieces.
Figure 7:
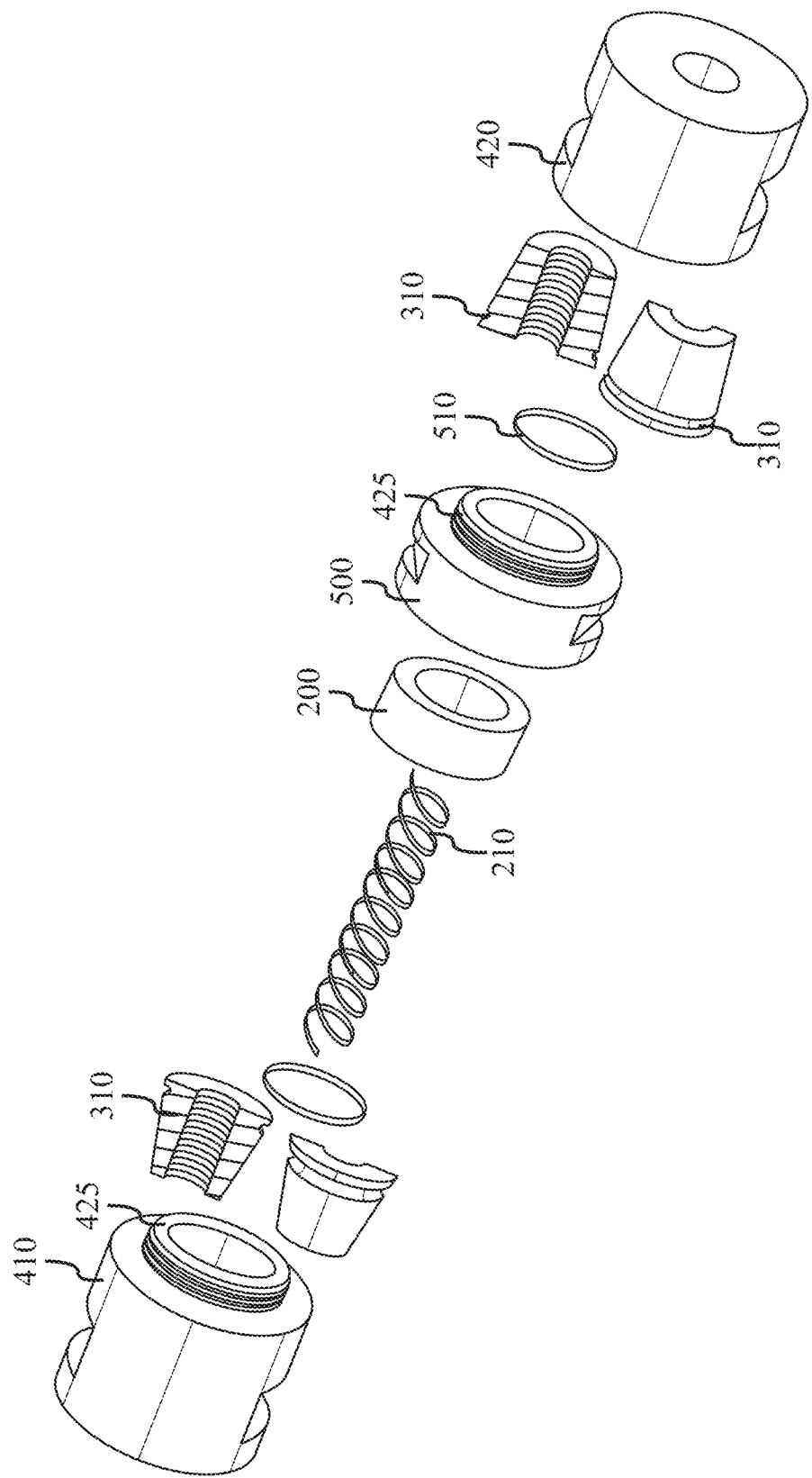
FIG. 7 is an exploded view of the three primary body configuration rebar coupler with no stop plate and an internal through cylinder, showing the individual components and their relative positions in the assembly.
Figure 8:
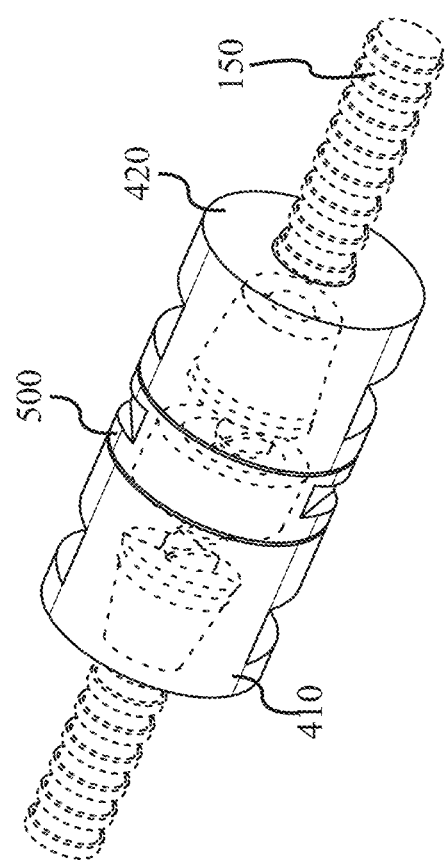
FIG. 8 is another view of the three primary body configuration rebar coupler with no stop plate and an internal through cylinder, providing additional detail on the internal structure.
Figure 9:
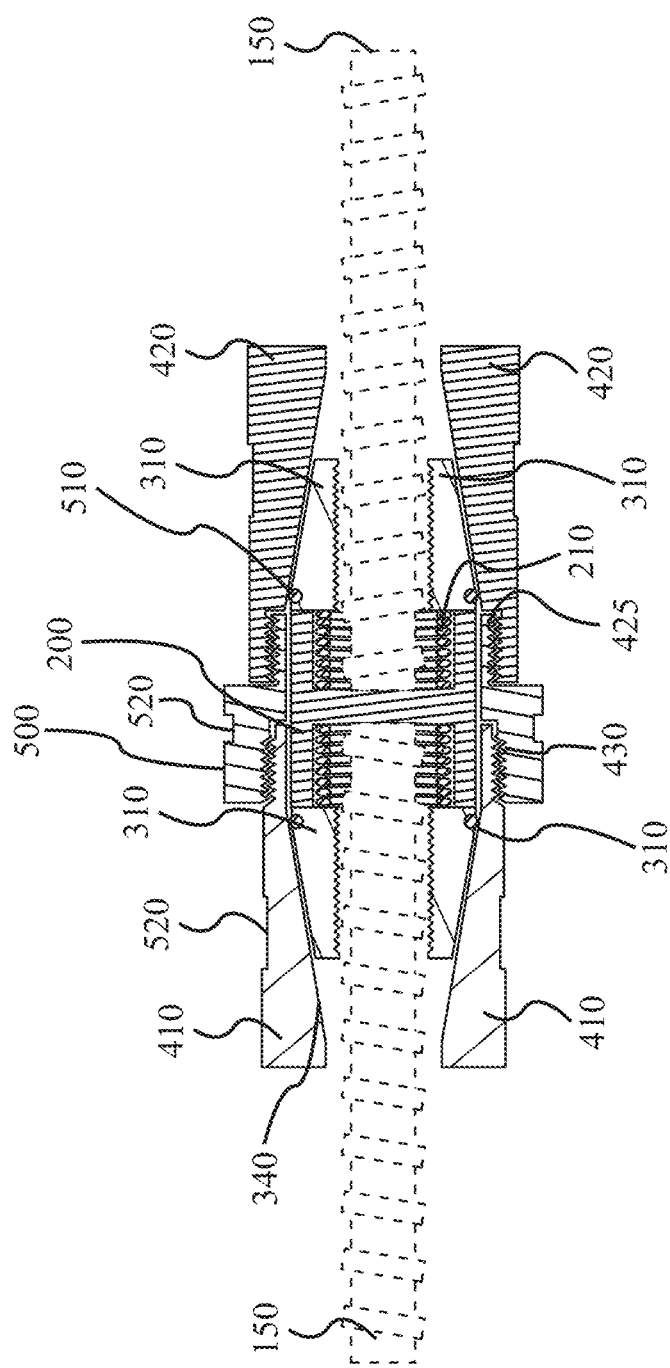
FIG. 9 is a cross-sectional view of a three primary body configuration rebar coupler with a stop plate within the internal cylinder, showing the internal components and their arrangement.
Figure 10:
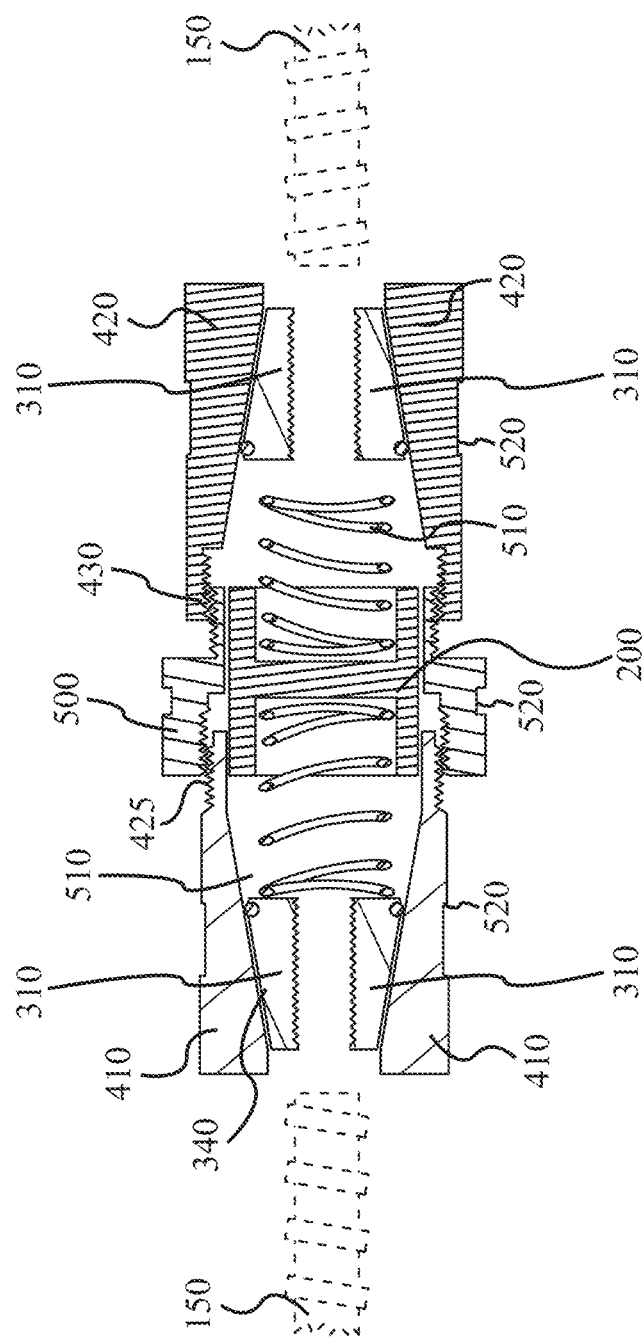
FIG. 10 is a longitudinal cross-sectional view of the three primary body configuration rebar coupler depicted in FIG. 9, illustrating the arrangement of internal components and the insertion of rebar pieces.
Figure 11:
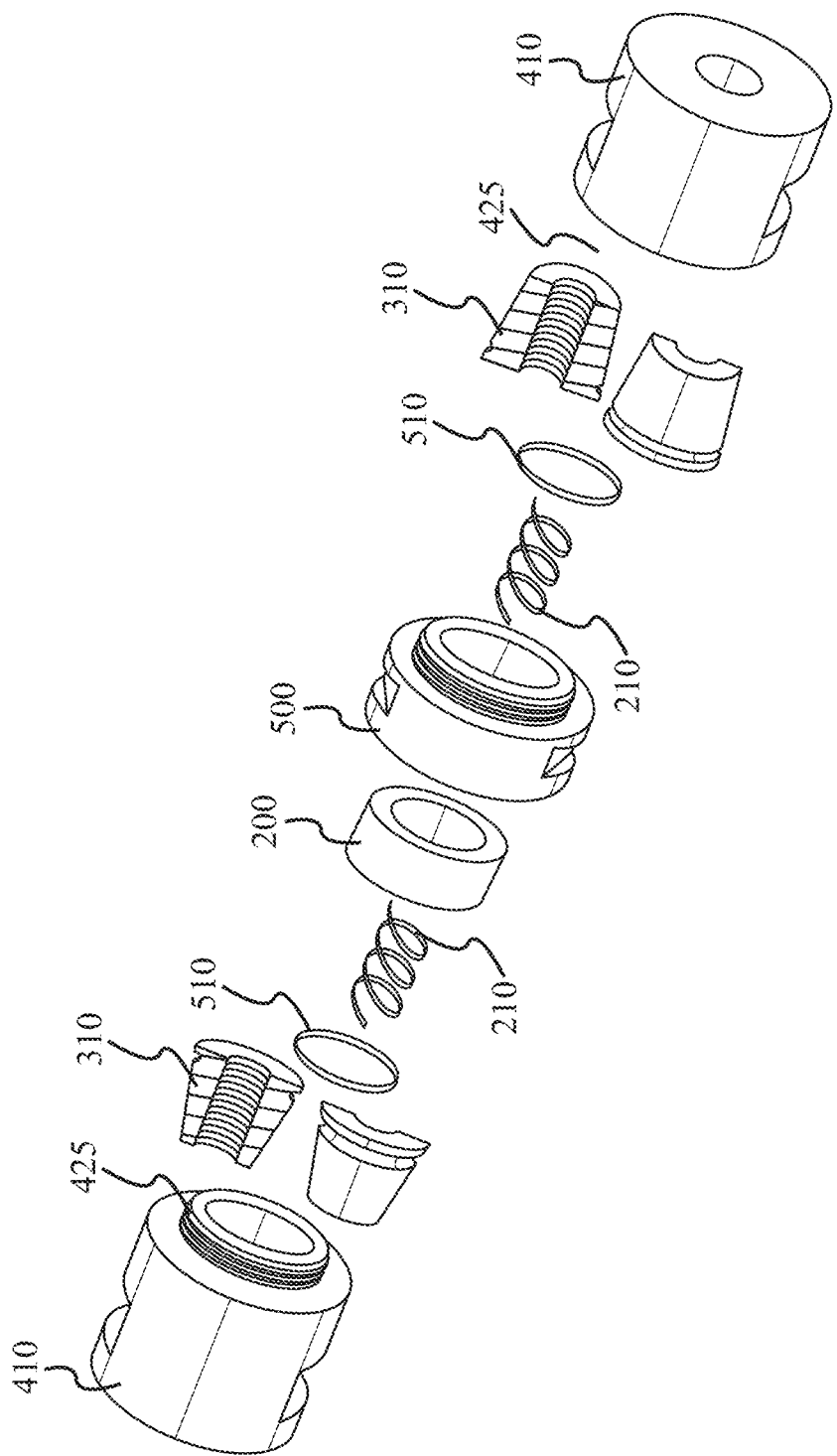
FIG. 11 is an exploded view of the three primary body configuration rebar coupler with a stop plate within the internal cylinder, showing the individual components and their relative positions in the assembly.
Figure 12:
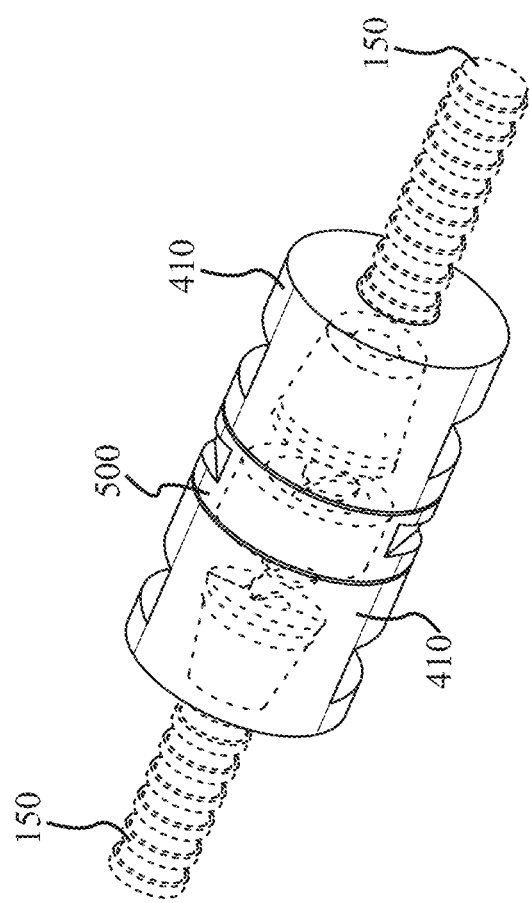
FIG. 12 is another view of the three primary body configuration rebar coupler with a stop plate within the internal cylinder, providing additional detail on the internal structure.
Figure 13:
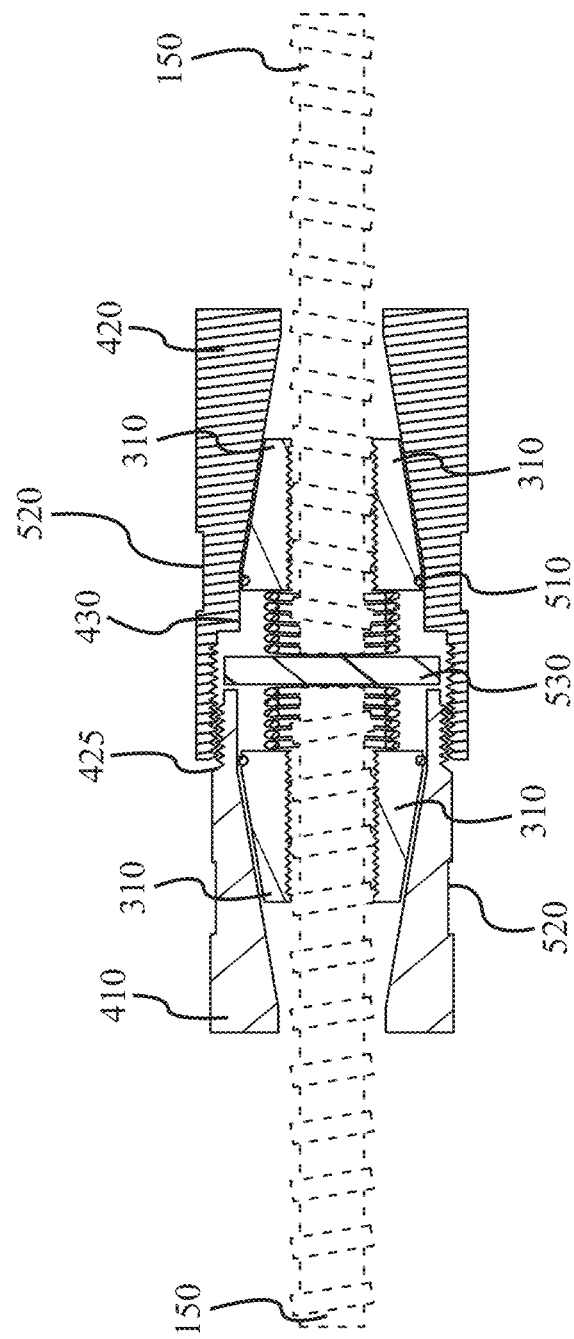
FIG. 13 is a cross-sectional view of a two primary body configuration rebar coupler with a stop plate, showing the internal components and their arrangement.
Figure 14:
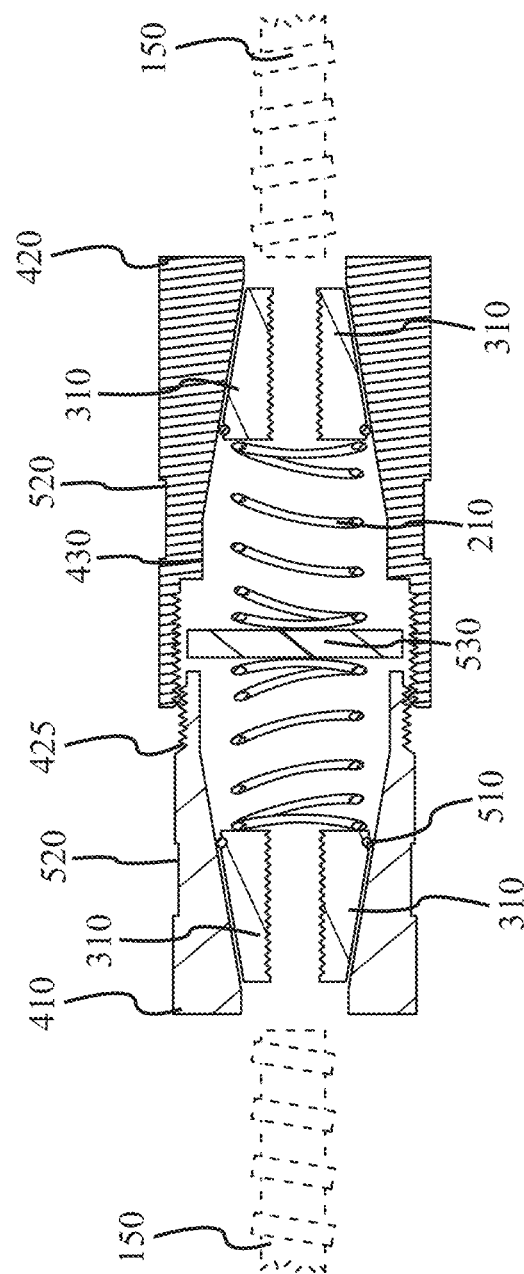
FIG. 14 is a longitudinal cross-sectional view of the two primary body configuration rebar coupler depicted in FIG. 13, illustrating the arrangement of internal components and the insertion of rebar pieces.
Figure 15:
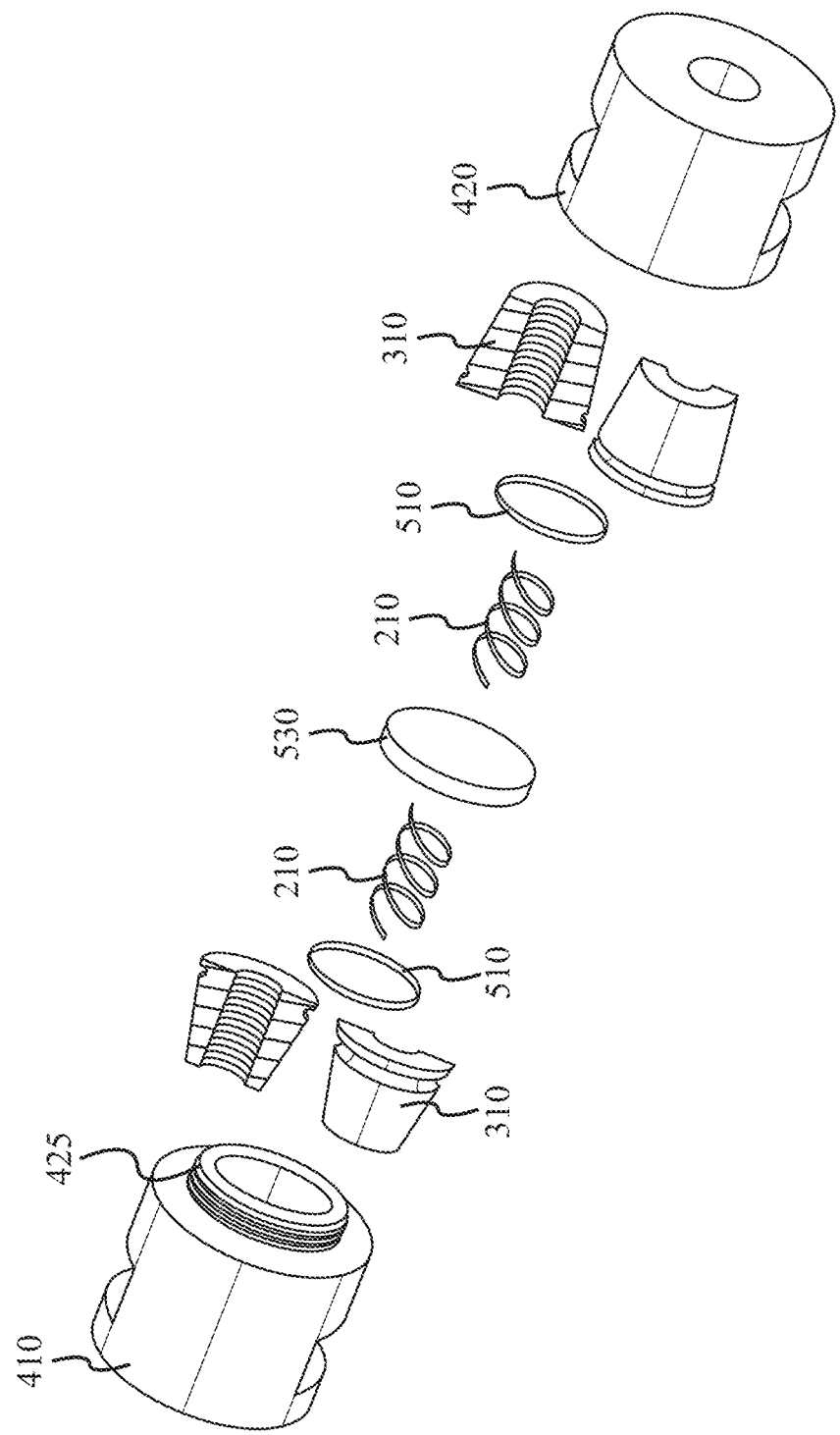
FIG. 15 is an exploded view of the two primary body configuration rebar coupler with a stop plate, showing the individual components and their relative positions in the assembly.
Figure 16:
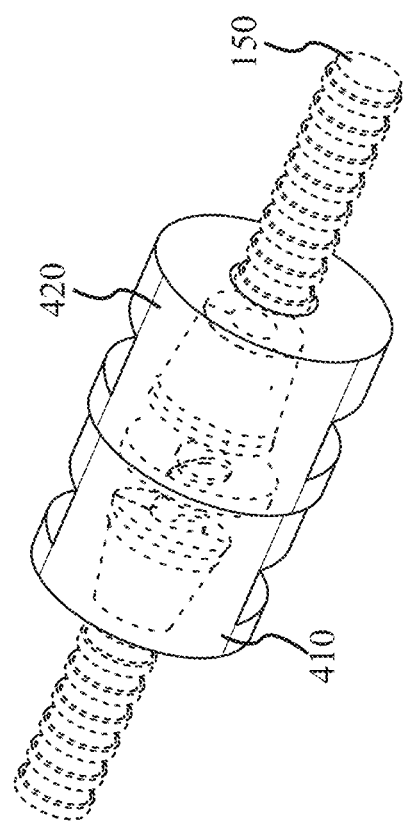
FIG. 16 is another view of the two primary body configuration rebar coupler with a stop plate, providing additional detail on the internal structure.

In an embodiment, in accordance with an intended use of the three primary body configuration as depicted by FIG. 5 a measured length of rebar is inserted into one side of the coupler and then the second piece of rebar is inserted in the opposite side of the coupler until it meets the first rebar inserted from the other side.

The three primary body configuration, like the two primary body configuration embodiments, provides the ability to accommodate various rebar sizes without modification and in various embodiments scaling of size to accommodate the various rebar sizes. This versatility is evident in the design of the tightening members 310 and internal tapers 430 shown in FIGS. 1-24.

In summary, the three primary body configuration embodiment as an evolution of the original two-piece design offers advantages in terms of manufacturing, assembly, and performance while maintaining the core benefits associated with other embodiments of the invention.

The three primary body configuration offers flexibility in the placement of the stop plate, which can be implemented in three main ways. In the first configuration embodiment, as shown in FIGS. 1-4, the central housing piece 500 incorporates the stop plate directly. This design allows for a more integrated structure, potentially simplifying the manufacturing process and reducing the number of separate components. FIGS. 5-8 illustrate a configuration embodiment where the internal cylinder 200 extends through the entire length of the coupler without a stop plate. This design embodiment presents advantages in terms of force distribution and assembly simplicity. As depicted in FIGS. 9-12, the third configuration embodiment places the stop plate inside the internal cylinder 200. This arrangement may provide benefits in terms of structural integrity and force transmission.

Each of these configurations maintains the core functionality of the rebar coupler while offering unique advantages. The present inventor has recognized that the choice between these configurations may depend upon on intended uses in various contexts depends on factors such as manufacturing considerations, specific application requirements, or performance optimization.

The three primary body configuration embodiments retain the key features of the two primary body embodiments, including the self-gripping mechanism and the emphasis on eliminating slip. The tightening members 310, in conjunction with the tapered bores 430 of the male threaded external housing 410 and female threaded external housing 420, continue to provide the gripping force necessary to secure the rebar pieces to provide a connective mechanism between different rebar bodies and prevent slip.

The spring 210 plays a crucial role in accordance with various three primary body configuration embodiments, providing the initial positioning and outward force on the tightening members 310. This ensures that the wedges of the tightening members are properly seated against the tapered bores 430 when the rebar is inserted and the coupler is tightened.

The three primary body configuration maintains the ability to accommodate various rebar sizes without modification and in accordance with an embodiment scaling of size of the coupler 100 to accommodate the various rebar sizes. The combination of the tightening members 310 and the tapered bores 430 allows for a range of rebar diameters to be securely gripped, from smaller sizes (e.g., #3 nominal rebar) to larger sizes (e.g., #18 nominal rebar) with a minimal number of scaled sizes of the coupler 100 in accordance with embodiments of the invention.

In terms of assembly and use, the three primary body configuration still allows for a single person to handle and install the coupler. The process of inserting the rebar pieces and tightening the coupler remains similar to the two-piece design, with the potential for improved ease of use or assembly depending on the specific configuration chosen. In accordance with various embodiments, the male threaded external housing 410, the central00024-Khan-housing piece 500, and/or the female threaded external housing 420 comprise a flat surface to aid in the grip of a wrench to facilitate more effective and more efficient tightening by one person.

The emphasis on eliminating slip remains a critical aspect of the three primary body configuration embodiments of the invention. This feature is particularly important for applications in transportation construction and structures subject to cyclical loading, where even minimal slip could compromise the structural integrity of the connection over time. By offering these additional configuration options, the three primary body configuration expands the potential applications and manufacturability of the rebar coupler, while maintaining its core benefits of simplicity, effectiveness, and slip resistance.

The three primary body configuration embodiment of the rebar coupler offers enhanced flexibility and potential advantages in certain applications. This configuration introduces a central housing piece 500 between the male threaded external housing 410 and female threaded external housing 420, resulting in a three-piece outer design.

The three variations of this configuration embodiment, as shown in FIGS. 1-12, can be elaborated as follows. A configuration with a stop plate built into the middle housing piece (as shown in FIGS. 1-4): In this configuration, the central housing piece 500 incorporates the stop plate directly. This design allows for a more integrated structure, potentially simplifying the manufacturing process and reducing the number of separate components. The stop plate serves as a fixed point against which the rebar ends can be positioned, ensuring proper alignment and preventing over-insertion. This configuration may provide enhanced stability and precision in the coupling process.

Another variation comprises a configuration embodiment with no stop plate and an internal through cylinder (as shown in FIGS. 5-8): This variation features an internal cylinder 200 that extends through the entire length of the coupler without a stop plate. The absence of a stop plate allows for a continuous internal space, which may offer advantages in terms of force distribution and assembly simplicity. In this configuration, the internal cylinder 200 provides the necessary opposing force to lock the rebar coupler into its fully tightened state. The continuous design may allow for more flexibility in accommodating various rebar lengths and potentially simplify the manufacturing process.

Another variation comprises configuration embodiment with a stop plate within the internal cylinder (as shown by FIGS. 9-12): In this arrangement, the stop plate is placed inside the internal cylinder 200. This configuration combines the benefits of having a stop plate with the advantages of a through cylinder design. The internal placement of the stop plate may provide benefits in terms of structural integrity and force transmission. It allows for precise positioning of the rebar ends while maintaining the continuous structure of the internal cylinder. This design may offer improved force distribution and potentially enhance the coupler's ability to minimize or eliminate slip.

In each of the above three configuration embodiments, the key components such as the tightening members 310, spring (s) 210, and the tapered bores 430 of the male threaded external housing 410 and female threaded external housing 420 continue to function as in the two-piece design embodiments. These components work together to provide the gripping force necessary to secure the rebar pieces and prevent slip.

The choice between these configurations may depend on factors such as specific application requirements, manufacturing considerations, or performance optimization. Each configuration maintains the core functionality of the rebar coupler while offering unique advantages in terms of assembly, force distribution, and structural integrity.

Exemplary Dimensions and Configurations

The specific ratios and dimensions for both the two primary body and three primary body configurations of the rebar coupler in accordance with exemplary embodiments are described as follows:

For the Two Primary Body Configuration:

The outer diameter of the threading 416 on the male threaded protrusion should be designed to be much closer to the outer diameter of the male threaded external housing 410 piece. This close dimensioning ensures a tight fit and maximizes the surface area for force transfer between the male and female threaded components.

The internal tapered bore 430 of both the male threaded external housing 410 and female threaded external housing 420 should have a tapering angle selected from within the range of 0.1 and 89.9 degrees. However, for optimal performance, an exemplary embodiment presents a tapering angle within the range of approximately 12-15 degrees.

The rebar coupler in an exemplary embodiment is designed to accommodate rebar sizes ranging from #3 nominal rebar (approximately 0.375 inch diameter) to #18 nominal rebar (approximately 2.25 inch diameter) with a minimal number of scaled sizes of the coupler.

For the Three Primary Body Configuration:

The three primary body configuration in embodiments builds upon the two-piece design, incorporating a central housing piece 500 between the male threaded external housing 410 and female threaded external housing 420. The specific ratios and dimensions for this configuration in various embodiments maintain consistency with the two-piece design where components are present in either configuration, particularly in association with the tapering angles and rebar size accommodation.

The central housing piece 500 should be dimensioned to allow for the incorporation of a stop plate, either built into the middle housing piece itself (as shown in FIGS. 1-4), or placed within the internal cylinder (as shown in FIGS. 9-12). The dimensions of this central piece in an exemplary embodiment maintain the overall proportions of the coupler while providing sufficient space for the internal components.

For Both the Two Primary Body and Three Primary Body Configurations:

The internal cylinder 200 in an exemplary embodiment is sized such that it prevents the two facing aspects of the male and female external cylinders from making direct contact. This dimensional relationship is crucial for ensuring that the coupler reaches its fully tightened state before the external housings touch each other. The spring 210 in an exemplary embodiment has an outer diameter no larger than the outer diameter of each of the tightening members 310 and 320, and an inner diameter no smaller than the outer diameter of the rebar pieces being joined.

The wedges comprising the tightening members 310 and 320 in an exemplary embodiment has an exterior taper 340 with an angle corresponding to the angle of internal tapering 430 of the male threaded external housing 410 and female threaded external housing 420.

In accordance with various embodiments, such ratios and dimensional relationships are critical for ensuring the proper functioning of the rebar coupler, particularly in achieving the no-slip characteristic that is emphasized as a critical aspect of the invention.

Intended Process of Use

The process of connecting rebar and tightening the rebar coupler in accordance with an intended exemplary use is described as follows:

First, the user inserts a piece of rebar 150 into one end of the rebar coupler 100 until it meets the internal cylinder with internal cylinder stop 200.

This step is then repeated for the second piece of rebar, inserting it into the opposite end of the coupler until it also meets the internal cylinder stop 200.

Next, the user attaches a pipe wrench or another suitable wrench capable of applying torque to the non-threaded aspect of the male threaded external housing 410. Similarly, another pipe wrench is attached to the female threaded external housing 420, or alternatively in a three piece configuration the central housing piece 500. In accordance with various embodiments, aspects of the female threaded external housing 420, or alternatively in a three piece configuration the central housing piece 500 comprise a flattened aspect on the housings (either in full or part the housing surfaces in accordance with various embodiments) to aid in the grip of the wrench to each of the members.

The user then applies force in opposing directions to each of the attached pipe wrenches. This action tightens the male threaded external housing 410 and female threaded external housing 420 members, causing them to screw together.

As the housings are tightened, the tapered bore 430 of each housing acts upon the exterior aspects of the abutting first set of tightening members 310 or second set of tightening members 320. This forces the tightening members towards the center of the rebar coupler 100 while simultaneously clamping down upon the inserted rebar 150.

The tightening process continues until the internal tapering of the first set of tightening members and the second set of tightening members is fully seated onto each of the inserted rebars. This action eliminates any potential gap between the rebar ends and the internal cylinder 200, which serves as the center stop.

In the case where there is still no contact between the rebar and the internal cylinder 200 as the center stop, the applied torque puts enough force on each of the first set of tightening members 310 and second set of tightening members 320 to seat them fully into the tapered bores. This ensures sufficient grip strength from each set of tightening members upon the corresponding piece of rebar, effectively eliminating any potential for significant slippage.

Throughout this process, the spring 210 plays a crucial role by providing initial positioning and outward force on the tightening members 310. This ensures that the wedges of the tightening members are properly seated against the tapered bores 430 when the rebar is inserted and the coupler is tightened.

The entire process is designed in accordance with an exemplary intended use to be performed by a single person, emphasizing the simplicity and ease of use of the rebar coupler. The result is a secure, slip-resistant connection between the two pieces of rebar, achieved with minimal effort and equipment.

Notably, this process in an exemplary intended use applies to both the two primary body configuration and the three primary body configuration of the rebar coupler, with slight variations depending on the specific design chosen (e.g., the placement of the stop plate in the three primary body configuration).

Improvements in Comparison to Prior Art Attempts

The rebar coupler invention described herein in its various embodiments offers significant advantages over existing products in the market, addressing several limitations of competing designs. In one example, the Lockshear Bolt Coupler, also known by the brand name "BarLock," is one such competing product. While it meets Caltrans requirements, it presents several drawbacks. This coupler requires the use of heavy, jarring equipment such as impact wrenches, which can be dangerous, especially when used at heights. The installation process involves screwing down with a gas or airpowered driver until the bolt head snaps off intentionally. This method can be problematic if not properly installed, potentially failing to meet Caltrans requirements for bridge construction.

Another prior art product is commonly known as the Threaded Coupler, or the "Taper-Lock Standard Coupler." This design faces multiple challenges. It requires extensive preparation of rebar ends with proprietary threads, often necessitating specialized equipment located primarily in rebar shops. This preparation process is time-consuming and labor-intensive, particularly challenging when working at heights during construction. The threaded coupler design also limits flexibility, as couplers with different thread types cannot be mixed and matched.

In contrast, the present invention described herein in its various embodiments provides a self-gripping, no-slip characteristic that addresses these limitations. It eliminates the need for heavy equipment or extensive rebar preparation, reducing safety risks and simplifying the installation process. The invention's design in its various embodiments allows for easy insertion of rebar without the need for threading or other modifications, making it particularly advantageous for use at heights or in challenging construction environments.

A key advantage of the present invention in its various embodiments is its ability to create an opposing force that locks the rebar in place, a feature not present in previously known designs. This mechanism is crucial for eliminating slip, which is a common problem in other coupling systems. The invention's design in its various embodiments, with its internal cylinder and wedge system, ensures a secure connection that can withstand cyclical forces typical in bridge and high-rise construction. Furthermore, the present invention in various embodiments offers simplicity in design and use, with fewer components compared to several previously known products. This simplicity enhances manufacturability and reduces the potential for installation errors. The invention also allows for secondary elimination of slip through the tightening action of the male and female external cylinders, a feature not present in some competing designs.

By addressing these limitations of existing products, the rebar coupler invention provides a more efficient, safer, and more reliable solution for rebar coupling in various construction applications, particularly in demanding environments such as bridge construction and high-rise buildings.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

I claim:

1. A rebar coupler comprising:
a male threaded external housing;
a female threaded external housing;
an internal cylinder configured to directly contact and apply an outward force directly upon tightening members to create mechanical interlock with inserted rebar pieces;
wherein the internal cylinder is formed of steel;
at least one spring extending through the internal cylinder;
a first set of tightening members comprising a plurality of pre-assembled tapered wedges having teeth configured to create mechanical interlock with and grip into a surface of a rebar; and
a second set of tightening members comprising a plurality of pre-assembled tapered wedges having teeth configured to create mechanical interlock with and grip into a surface of a rebar;
wherein the male threaded external housing and female threaded external housing are configured to be directly screw-coupled to enable the internal cylinder to create an opposing force on the tightening members in contact with the internal cylinder that locks inserted rebar pieces in place through direct mechanical interlock between the teeth and rebar surfaces.

2. The rebar coupler of claim 1, wherein the internal cylinder is sized to prevent direct contact between facing aspects of the male threaded external housing and the female threaded external housing by maintaining pressure against the tightening members, and wherein the internal cylinder applies outward force on the tightening members to resist deformation under compression loads.

3. The rebar coupler of claim 1, wherein the first and second sets of tightening members each comprise an elastic support ring, and wherein the elastic support ring maintains the tightening members in an assembled state when inserted into the coupler.

4. The rebar coupler of claim 1, wherein the male threaded external housing and female threaded external housing each comprise a tapered bore with a tapering angle between 0.1 and 89.9 degrees, and wherein the tapered bore corresponds to the taper of the pre-assembled wedges.

5. The rebar coupler of claim 4, wherein the tapering angle is between 3 and 5 degrees.

6. The rebar coupler of claim 1, wherein the rebar coupler is configured to accommodate rebar sizes ranging from #4 nominal rebar to #11 nominal rebar without modification.

7. The rebar coupler of claim 1, further comprising a central housing piece positioned between the male threaded external housing and the female threaded external housing, wherein the central housing piece maintains proper alignment of the internal cylinder, and wherein the male threaded external housing and female threaded external housing are coupled with the central housing piece therebetween.

8. The rebar coupler of claim 7, wherein the central housing piece incorporates a stop plate.

9. The rebar coupler of claim 7, wherein the internal cylinder extends through the entire length of the coupler without a stop plate.

10. The rebar coupler of claim 7, wherein the internal cylinder includes a stop plate within it, and wherein the stop plate is configured to ensure proper positioning of the rebar ends.

11. A method of coupling rebar comprising:
inserting a first piece of rebar into one end of a rebar coupler until it meets an internal stop or reaches a predetermined distance of insertion;
inserting a second piece of rebar into an opposite end of the rebar coupler until it meets an internal stop or reaches a predetermined distance of insertion;
applying torque to a male threaded external housing and a female threaded external housing of the rebar coupler to tighten them together, thereby causing an internal cylinder to apply uniform outward force directly upon pre-assembled tapered wedges having teeth;

forcing the pre-assembled tapered wedges towards a center of the rebar coupler;

and creating mechanical interlock between the teeth and surfaces of the inserted rebar pieces through the uniform outward force of the internal cylinder.

12. The method of claim 11, wherein the rebar coupler further comprises a central housing piece between the male threaded external housing and the female threaded external housing, and wherein the central housing piece maintains proper alignment of the internal cylinder during tightening.

13. The method of claim 11, wherein the tightening of the male threaded external housing and female threaded external housing creates an opposing force that locks the rebar pieces in place through the mechanical interlock between the teeth of the pre-assembled tapered wedges and the rebar surfaces.

14. The method of claim 11, wherein the method is performed by a single person without requiring specialized equipment or rebar end preparation.

15. A rebar coupler system configured to comply with CalTrans CT670 test methods, the system comprising:
a male threaded external housing;
a female threaded external housing;
an internal cylinder formed of steel and configured to directly contact and apply an outward force upon tightening members to create mechanical interlock with inserted rebar pieces;
at least one spring extending through the internal cylinder;
a first set of tightening members comprising a plurality of pre-assembled tapered wedges having teeth configured to create mechanical interlock with and grip into a surface of a rebar;
a second set of tightening members comprising a plurality of pre-assembled tapered wedges having teeth configured to create mechanical interlock with and grip into a surface of a rebar; and
wherein the system is configured to
minimize or eliminate slip between coupled rebar pieces under cyclic loading conditions;
function independently of surrounding concrete;
provide direct mechanical connection between the rebar pieces without requiring specialized equipment or bar end preparation; and
exceed 125% of specified yield strength as defined by ASTM A615 and achieve 100% of ultimate tensile strength requirements as specified in ACI 318.

16. A rebar coupler comprising:
a male threaded external housing;
a female threaded external housing;
an internal cylinder formed of steel and configured to directly contact and apply an outward force upon tightening members to create mechanical interlock with inserted rebar pieces;
at least one spring extending through the internal cylinder;
a first set of tightening members comprising a plurality of wedges; and
a second set of tightening members comprising a plurality of wedges;
wherein the male threaded external housing and female threaded external housing are configured to be coupled with a central housing piece positioned therebetween to create an opposing force that locks inserted rebar pieces in place;
wherein the central housing piece maintains proper alignment of the internal cylinder;
and;
wherein the internal cylinder extends through the central housing piece without a stop plate.

* * * * *